United States Patent
Dalla Libera

(10) Patent No.: US 12,481,291 B2
(45) Date of Patent: Nov. 25, 2025

(54) MAP GENERATION DEVICE AND MAP GENERATION SYSTEM

(71) Applicant: Panasonic Intellectual Property Management Co., Ltd., Osaka (JP)

(72) Inventor: Fabio Dalla Libera, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 18/411,737

(22) Filed: Jan. 12, 2024

(65) Prior Publication Data

US 2024/0142992 A1    May 2, 2024

Related U.S. Application Data

(63) Continuation of application No. PCT/JP2021/044852, filed on Dec. 7, 2021.

(30) Foreign Application Priority Data

Jul. 30, 2021 (JP) .................................. 2021-125928

(51) Int. Cl.
  *G05D 1/246* (2024.01)
  *A47L 11/40* (2006.01)
  (Continued)

(52) U.S. Cl.
  CPC .......... *G05D 1/246* (2024.01); *A47L 11/4011* (2013.01); *G05D 1/244* (2024.01);
  (Continued)

(58) Field of Classification Search
  None
  See application file for complete search history.

(56) References Cited

U.S. PATENT DOCUMENTS

| 6,098,015 A | 8/2000 | Nimura et al. |
| 2006/0293810 A1 | 12/2006 | Nakamoto |

(Continued)

FOREIGN PATENT DOCUMENTS

| JP | 8-211936 | 8/1996 |
| JP | 9-287968 | 11/1997 |

(Continued)

OTHER PUBLICATIONS

Machine translation of JP 2006209106 A (Year: 2006).*

(Continued)

*Primary Examiner* — Anne Marie Antonucci
*Assistant Examiner* — Kyle S Park
(74) *Attorney, Agent, or Firm* — Wenderoth, Lind & Ponack, L.L.P.

(57) ABSTRACT

A map generation device that generates a route. The map generation device includes: a node detector that detects a node; a node information obtainer that obtains detected node information including location information of the detected node and path information indicating a positional relationship between the detected node and a path connected to the detected node; a node determiner that determines whether the detected node information matches previously-reached node information; a node information adder that adds, to the route map, the detected node information as new previously-reached node information when the node determiner determines a mismatch; and a map corrector that, when the node determiner determines a match, determines that the detected node corresponding to the detected node information and a node corresponding to the previously-reached node information are a same node and corrects the route map.

9 Claims, 31 Drawing Sheets

(51) Int. Cl.
   *G05D 1/244*   (2024.01)
   *G05D 1/646*   (2024.01)
   *G05D 105/10*   (2024.01)
(52) U.S. Cl.
   CPC .......... *G05D 1/646* (2024.01); *A47L 2201/04*
       (2013.01); *G05D 2105/10* (2024.01)

(56) References Cited

U.S. PATENT DOCUMENTS

2008/0091344 A1* 4/2008 Mikuriya ........... G01C 21/3878
                                                    701/450
2020/0125113 A1* 4/2020 Eoh ..................... G06F 18/2413
2021/0018929 A1* 1/2021 Choi .................... G05D 1/2469

FOREIGN PATENT DOCUMENTS

JP       2006209106 A  *  8/2006
JP       2006-346767      12/2006
KR       20070061079 A  *  6/2007    ............ B25J 9/1694

OTHER PUBLICATIONS

Machine translation of KR-20070061079-A (Year: 2007).*
International Search Report issued Feb. 1, 2022 in International (PCT) Application No. PCT/JP2021/044852.

* cited by examiner

FIG. 7
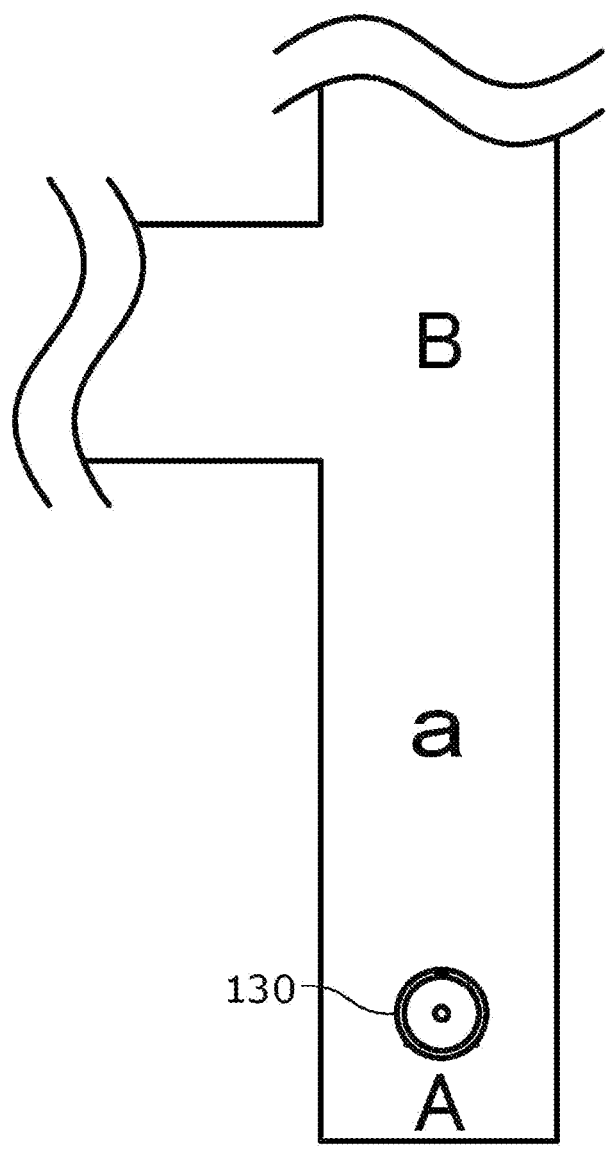
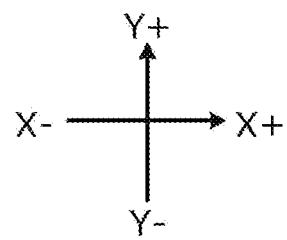

FIG. 25
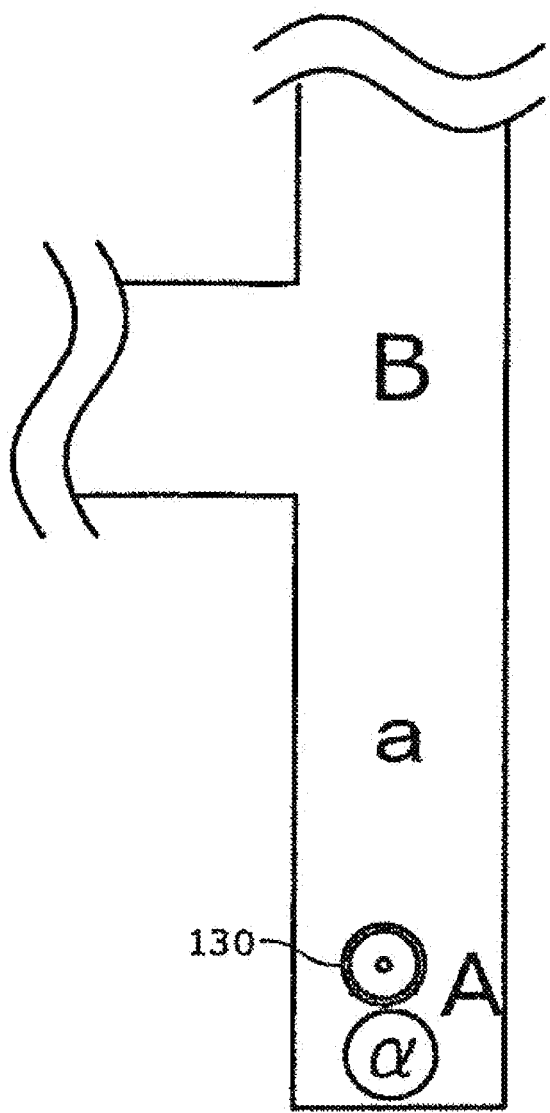
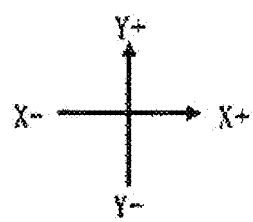

MAP GENERATION DEVICE AND MAP GENERATION SYSTEM

CROSS REFERENCE TO RELATED APPLICATIONS

This is a continuation application of PCT International Application No. PCT/JP2021/044852 filed on Dec. 7, 2021, designating the United States of America, which is based on and claims priority of Japanese Patent Application No. 2021-125928 filed on Jul. 30, 2021. The entire disclosures of the above-identified applications, including the specifications, drawings and claims are incorporated herein by reference in their entirety.

FIELD

The present disclosure relates to a map generation device and map generation system that generate a route map by traveling along an untraveled path.

BACKGROUND

As a method for detecting the self-location of a robot that autonomously travels, a method in which a marker is disposed in an area in which the robot travels and the robot detects the marker so as to detect the self-location of the robot based on previously stored information on the absolute coordinates of the marker is proposed (e.g., Patent Literature (PTL) 1).

CITATION LIST

Patent Literature

PTL 1: Japanese Unexamined Patent Application Publication No. 2006-346767

SUMMARY

Technical Problem

However, in an area in which a marker cannot be detected, the self-location of a robot is obtained by an odometry sensor or the like. Accordingly, even when the self-location of the robot is once corrected by a marker, an error (deviation) may occur in information obtained from the odometry sensor due to wheelspin of the robot depending on the state of a floor or the like and such error may accumulate.

Thus, when error in the self-location accumulates, a route map different from the reality may be generated by recognizing a node through which the robot has passed a plurality of times as different nodes or recognizing different nodes as the same node.

The present disclosure provides a map generation device and map generation system that enable correct route map generation even when an error has occurred in a self-location recognized.

Solution to Problem

A map generation device of the present disclosure is a map generation device that generates a route map showing a plurality of paths that intersect with each other. The map generation device includes: a node detector that detects, as a detected node, a node where two or more of the plurality of paths intersect with each other or where one of the plurality of paths comes to a dead end; a node information obtainer that obtains detected node information including (i) location information of a detected node that is detected by the node detector and (ii) path information indicating a positional relationship between the detected node and a path that is connected to the detected node among the plurality of paths; a node determiner that compares the detected node information with previously-reached node information that is node information already stored, and determines whether the detected node information matches the previously-reached node information; a node information adder that adds, to the route map, the detected node information as new previously-reached node information when the node determiner determines a mismatch; and a map corrector that, when the node determiner determines a match, determines that the detected node corresponding to the detected node information and a node corresponding to the previously-reached node information are a same node and corrects the route map.

A map generation system of the present disclosure includes: the map generation device; a mobile apparatus that travels along the plurality of paths; a path information obtaining device that obtains path information relating to, among the plurality of paths, a path that is present in a vicinity of the mobile apparatus; a self-location detection device that detects a self-location that is a location of the mobile apparatus; and a marker detection device that detects a marker present in at least one place in the plurality of paths. The map generation device generates the route map based on the path information.

Advantageous Effects

According to the present disclosure, it is possible to generate a topologically correct route map for an untraveled area.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 illustrates the initial state of a map generation operation in Embodiment 1.

FIG. 25 illustrates phase 1 of the map generation operation in Embodiment 3.

DESCRIPTION OF EMBODIMENTS

Hereinafter, embodiments of a map generation device and map generation system according to the present disclosure will be described with reference to the Drawings. It should be noted that the embodiments described below each show an example for explaining the present disclosure and therefore do not intend to limit the present disclosure. For example, the shapes, structures, materials, constituent elements, relative positional relationships, connection states, numerical values, mathematical expressions, content of each phase in a method, the processing order of phases etc. shown in the following exemplary embodiments are mere examples, and therefore may include content not described below.

Although a geometric term such as parallel or orthogonal may sometimes be used, such term is not intended to be mathematically precise and includes an error or deviation that is substantially allowable. Moreover, a term such as simultaneously or same also includes a range that is substantially allowable.

Each of the Drawings is a schematic view in which an exaggeration, omission, or adjustment of a scale is made for the purpose of illustrating the present disclosure, and may be different from the actual shape, positional relationship, or scale.

Hereinafter, plural techniques may be comprehensively described as a single embodiment. Part of the content below is described as an arbitrary constituent element pertaining to the present disclosure.

Embodiment 1

Figure 1:
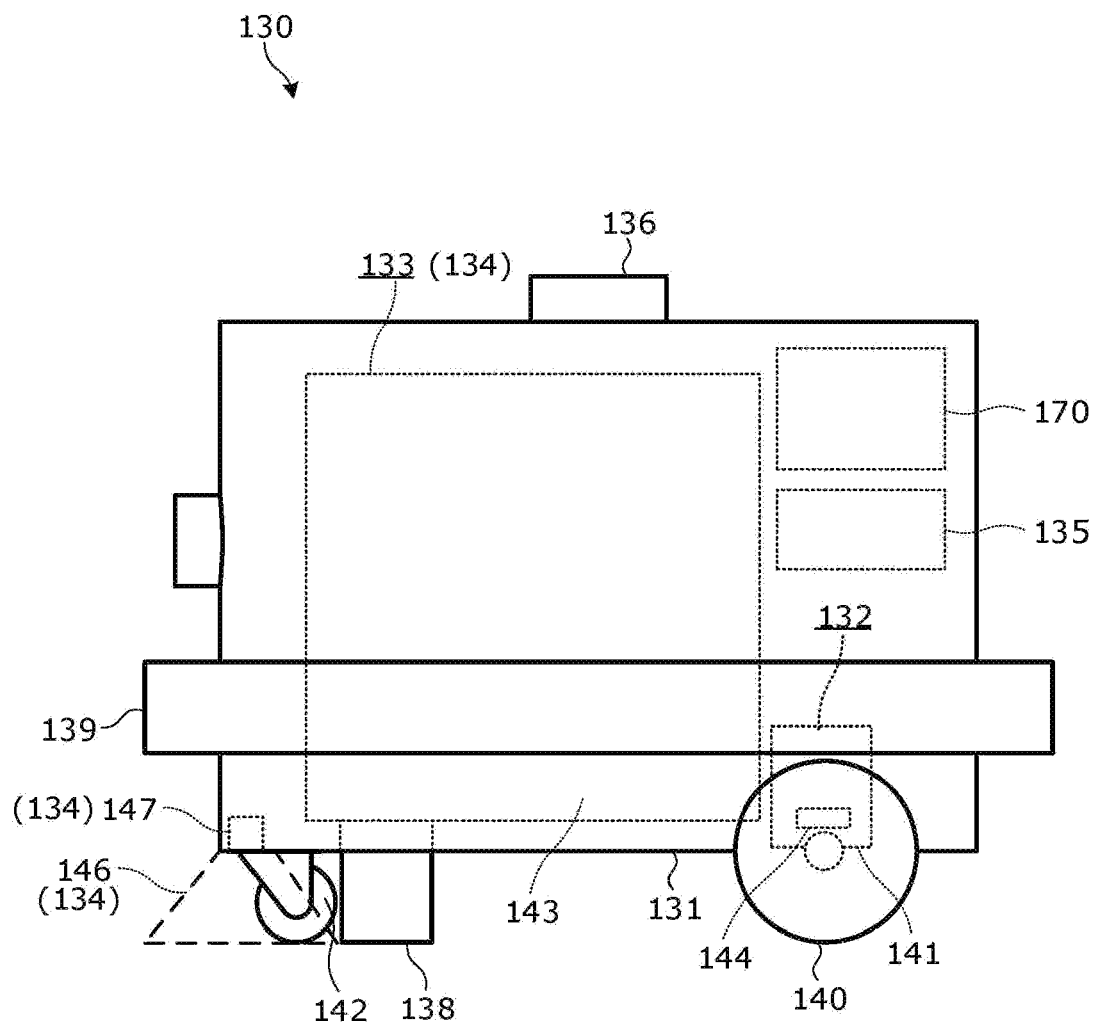
FIG. 1 is a side view illustrating the external appearance of a mobile apparatus according to Embodiment 1.
Figure 2:
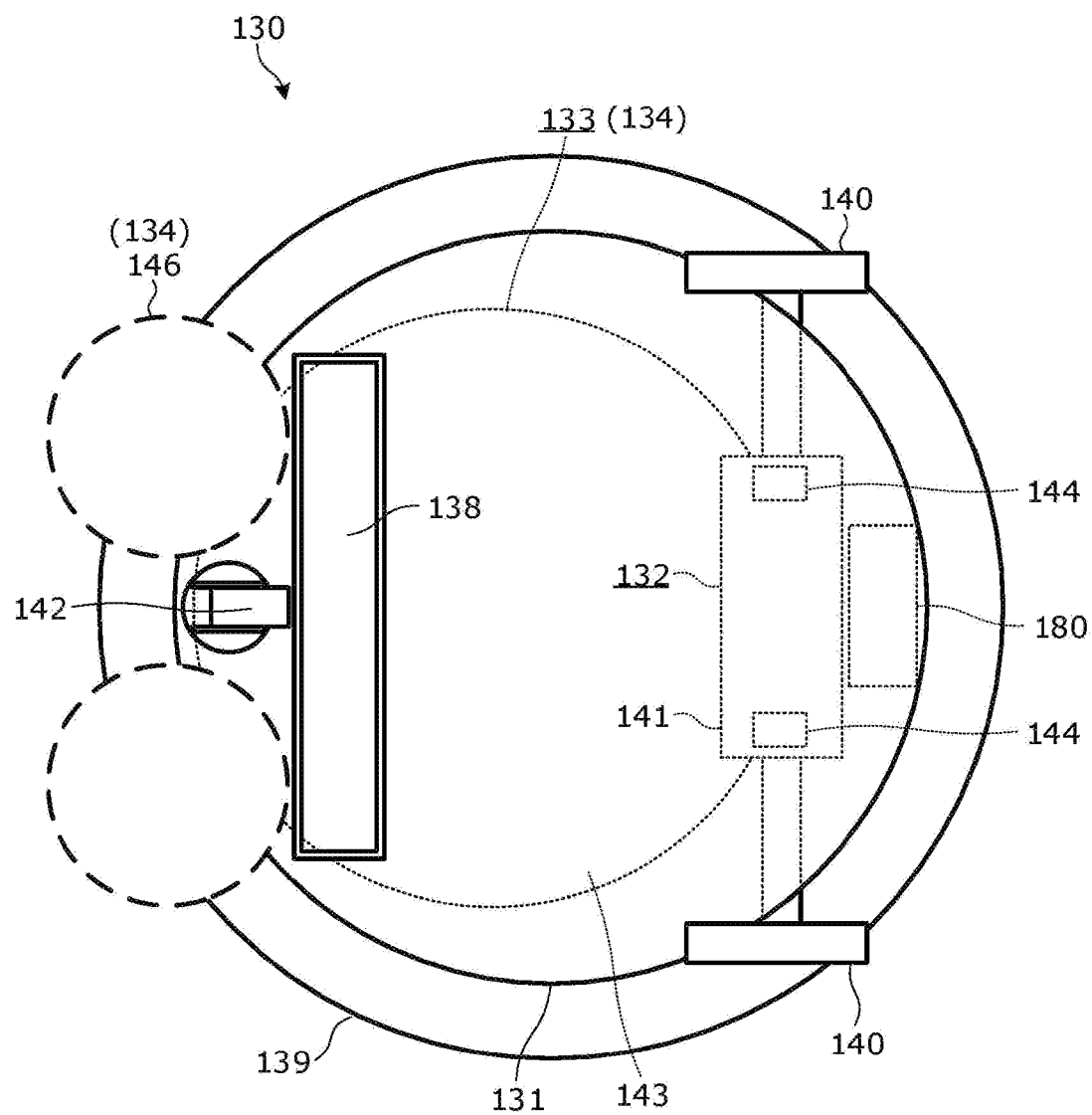
FIG. 2 is a bottom view illustrating the external appearance of the mobile apparatus according to Embodiment 1.

FIG. 1 is a side view illustrating the external appearance of mobile apparatus 130 including map generation device 170 according to Embodiment 1. FIG. 2 is a bottom view illustrating the external appearance of mobile apparatus 130 including map generation device 170 according to Embodiment 1. In Embodiment 1, mobile apparatus 130 is a robotic vacuum cleaner that performs cleaning while autonomously traveling. Moreover, mobile apparatus 130 is an apparatus that can generate, for an untraveled area such as a floor in which cleaning is to be performed for the first time, a route map while autonomously traveling, and mobile apparatus 130 includes driving device 132, path information obtaining device 136, self-location detection device 144, and map generation device 170.

In Embodiment 1, mobile apparatus 130 further includes body 131 equipped with various constituent elements, cleaner 134 for collecting dust, and controller 135.

Body 131 is a case that houses driving device 132, path information obtaining device 136, self-location detection device 144, map generation device 170, cleaner 134, and controller 135. Bumper 139 that is displaceable in a radial direction with respect to body 131 is attached to the outer peripheral portion of body 131. Moreover, as illustrated in FIG. 2, inlet 138 for drawing dust into body 131 is provided to the bottom surface portion of body 131.

Driving device 132 is a device that causes mobile apparatus 130 to travel based on an instruction from controller 135. Driving device 132 includes wheel 140 that travels along a path, a motor for traveling (not illustrated) that provides torque to wheel 140, and housing 141 that houses the motor for traveling. Caster 142 as an auxiliary wheel is provided to the bottom surface of body 131. Mobile apparatus 130 can travel freely, that is, can travel forward and backward and turn left and right freely, by controlling the movement of two wheels 140 individually.

Cleaner 134 is a device for collecting dust and drawing in the dust through inlet 138 and includes rotating brush 146 disposed in the vicinity of inlet 138, brush driving motor 147 for causing rotating brush 146 to rotate, suction device 133, or the like.

Suction device 133 is a device that draws in dust through inlet 138 and holds the dust drawn into body 131, and includes an electric fan (not illustrated) and dust holder 143. The electric fan draws in dust through inlet 138 by drawing in air inside dust holder 143 and expelling the air to the outside of body 131, to thereby cause the dust to be stored in dust holder 143.

Path information obtaining device 136 is a device that is attached to body 131 to thereby travel in conjunction with mobile apparatus 130, and detects, in a surrounding area of mobile apparatus 130, a path along which mobile apparatus 130 can travel. Path information obtaining device 136 obtains 2.5-dimensional information by detecting, for example, a direction of or distance to an obstacle such as a wall, furniture, or the like present in the vicinity of body 131. Moreover, it is possible to recognize the self-location of mobile apparatus 130 from the information on the direction and distance detected by path information obtaining device 136. The type of path information obtaining device 136 is not particularly limited, and path information obtaining device 136 can be exemplified by a Light Detection and Ranging (LiDAR) or a Time of Flight (ToF) camera that emits light and detects, based on the light reflected off an obstacle, the location of the obstacle and a distance between the obstacle and the LiDAR or the ToF camera, for example.

For another example, path information obtaining device 136 can be exemplified by a stereo camera that captures, as an image, illumination light or natural light reflected off an obstacle and obtains the location of the obstacle and a distance between the obstacle and the stereo camera based on the parallax.

Self-location detection device 144 is attached to body 131 to thereby travel in conjunction with mobile apparatus 130, and detects, based on the travel history of mobile apparatus 130 by driving device 132, the relative self-location with respect to a predetermined location. The type of self-location detection device 144 is not particularly limited, and self-location detection device 144 can be exemplified by an odometry sensor such as an encoder that is included in driving device 132 and detects a rotation angle of each of the pair of wheels 140 that is rotated by the motor for traveling, for example. Moreover, mobile apparatus 130 may include, as self-location detection device 144, an inertial sensor such as an acceleration sensor that detects an acceleration of mobile apparatus 130 when mobile apparatus 130 travels or an angular velocity sensor that detects an angular velocity of mobile apparatus 130 when mobile apparatus 130 turns. Furthermore, self-location detection device 144 may include Global Positioning System (GPS).

It should be noted that mobile apparatus 130 may include another sensor in addition to path information obtaining device 136. For example, mobile apparatus 130 may include floor sensors that are arranged on the bottom surface of body 131 and detect whether a floor is present. Moreover, mobile apparatus 130 may include a dust-amount sensor that measures the amount of dust accumulated on a floor. Furthermore, mobile apparatus 130 may include a contact sensor that detects displacement of bumper 139 to thereby detect contact with an obstacle. Furthermore, mobile apparatus 130 may include an obstacle sensor, such as an ultrasonic sensor other than path information obtaining device 136, that detects an obstacle present in front of body 131.

Figure 3:
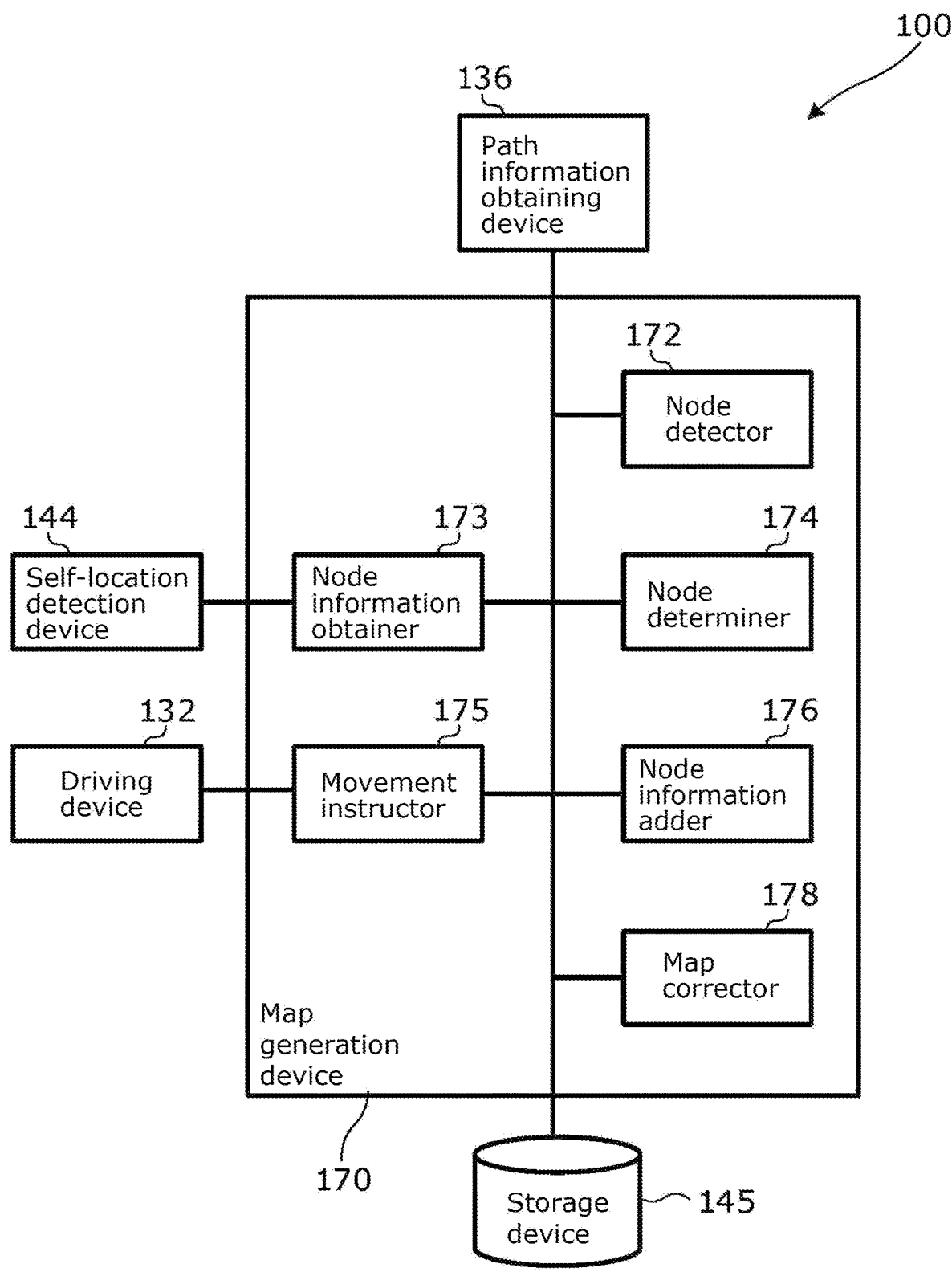
FIG. 3 is a block diagram illustrating each functional element of a map generation device in Embodiment 1.

FIG. 3 is a block diagram illustrating each functional element of map generation device 170 in Embodiment 1. Map generation device 170 is a device that generates, based on the travel history of mobile apparatus 130, a route map showing a route along which mobile apparatus 130 has traveled. Map generation device 170 includes, as processing units realized by a processor executing a program, node detector 172, node information obtainer 173, node determiner 174, movement instructor 175, node information adder 176, and map corrector 178. Hereinafter, each of the processing units will be described; however, the order of descriptions thereof does not correspond to the order of processes performed by map generation device 170. The flow of processes performed by map generation device 170 will be described later.

Node detector 172 detects a node at which paths intersect with each other or at which a path comes to a dead end, based on data obtained from path information obtaining device 136 of mobile apparatus 130 that has reached the node. As a specific example, path information obtaining device 136 such as LiDAR detects a direction of and distance to an obstacle present in the vicinity of mobile apparatus 130. Node detector 172 detects, based on location information of the obstacle detected, a path along which mobile apparatus 130 can travel. When a plurality of paths intersecting with each other are detected, node detector 172 detects intersection of the plurality of paths as a node. Moreover, a dead end (cul-de-sac) is also detected as a node.

It should be noted that a corner may also be recognized as an intersection where two paths meet, and detected as a node.

Figure 4:
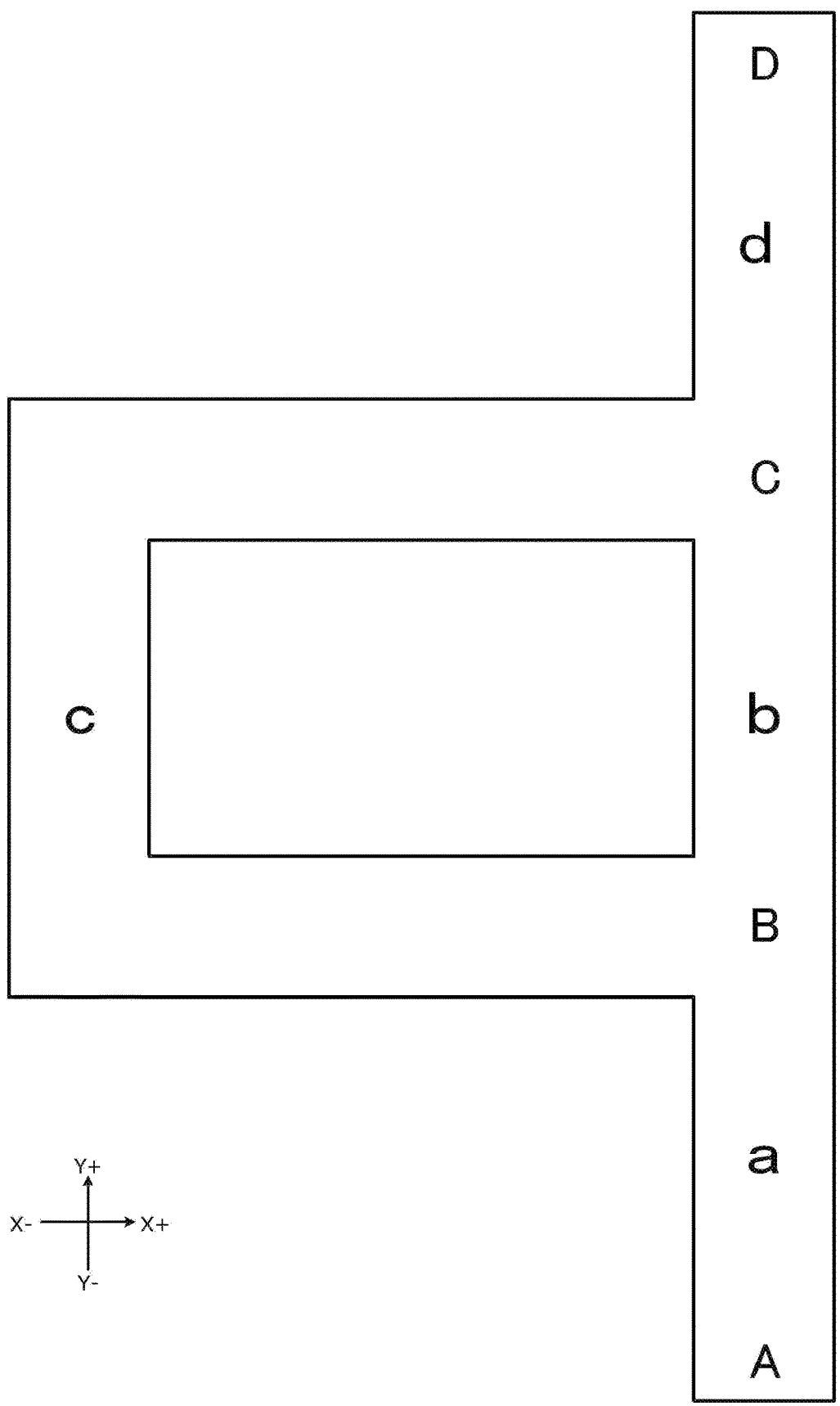
FIG. 4 illustrates a route that is a target for route map generation in Embodiment 1.

FIG. 4 illustrates a whole route that is a target for route map generation. In FIG. 4, the uppercase letters A, B, C, and D represent nodes and the lowercase letters a, b, c, and d represent paths.

It should be noted that, in Embodiment 1, a corner is not included as a node. By not including a corner as a node, the time required for route map generation can be shortened. Moreover, topological accuracy of a route map generated is not decreased.

Node information obtainer 173 obtains node information including location information of a detected node and path information indicating a positional relationship between the detected node and a path connected to the detected node. Node information obtainer 173 causes storage device 145 to store the node information obtained. Location information of a node is obtained based on location information obtained from self-location detection device 144. Path information is obtained based on path information obtained from path information obtaining device 136. For example, node information includes: information identifying a node including an untraveled candidate node connected to a path connected to a detected node; and, when there are a plurality of untraveled candidate nodes connected to ends of paths connected to a detected node, information indicating an arrangement order of the untraveled candidate nodes in, for example, a counterclockwise direction about the detected node.

For example, it is assumed that mobile apparatus 130 reaches node B illustrated in FIG. 4. A node detected based on data obtained from path information obtaining device 136 is node B. In this phase, as illustrated in the multigraph in FIG. 5, information indicating, in a counterclockwise manner, path a leading to node A, path b connected to untraveled candidate node C, and path c connected to untraveled candidate node C' is obtained as node information from path information obtaining device 136. It should be noted that, in the Drawings, an underline drawn under an uppercase letter indicates that mobile apparatus 130 has reached. A multigraph is a graph that can include multiple edges, that is, edges sharing the same end node, in graph theory.

Node determiner 174 compares detected node information that is node information corresponding to a node reached by mobile apparatus 130 and detected by node detector 172 with previously-reached node information that is previously stored node information corresponding to a node previously reached by mobile apparatus 130, and determines whether the detected node information matches the previously-reached node information.

Although a determination method is not specifically limited, in Embodiment 1, node determiner 174 extracts previously-reached node information corresponding to a previously-reached node that is located closest to a detected node. Then, when a distance between the detected node and the previously-reached node is less than or equal to a predetermined distance threshold value, path information included in the previously-reached node information extracted is compared with path information of detected node information, and then, when the number of paths connected to the previously-reached node and the number of paths connected to the detected node match each other, the detected node information is determined to match the previously-reached node information.

It should be noted that when there is no corresponding previously-reached node, node determiner 174 determines that there is no match. Moreover, the distance threshold value may vary and, for example, may be proportional to the distance traveled by mobile apparatus 130.

When node determiner 174 has completed determination, movement instructor 175 controls driving device 132 to cause mobile apparatus 130 to travel to a next candidate node.

When node determiner 174 determines that there is no match, node information adder 176 adds, to a route map, detected node information as new previously-reached node information and causes storage device 145 to store the new previously-reached node information. Information added to the route map is, specifically, node information. Moreover, node information added by node information adder 176 may include a distance between a detected node and a previously-reached node that has been reached just before reaching the detected node, an angle between a predetermined reference line and a line extending in a direction from the previously-reached node to the detected node, or the like. Map generation device 170 generates the route map based on these information.

When node determiner 174 determines that there is a match, map corrector 178 determines that the node corresponding to the detected node information and the node corresponding to the previously-reached node information are the same and corrects the route map.

Figure 6:
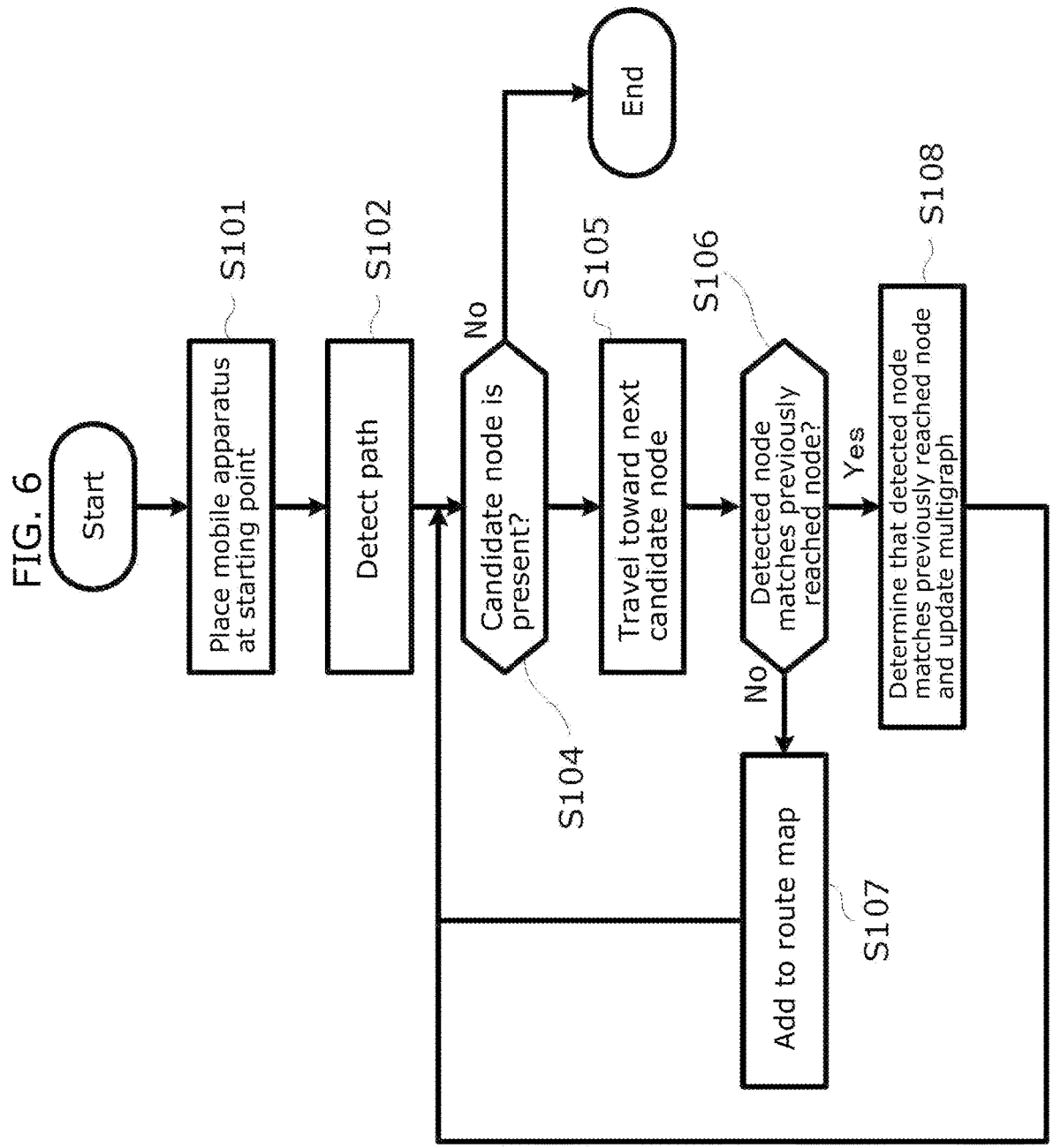
FIG. 6 is a flowchart illustrating a flow of operations performed by the map generation device in Embodiment 1.

Next, a route map generation operation performed by map generation device 170 included in mobile apparatus 130 will be described. FIG. 6 is a flowchart illustrating a flow of operations performed by map generation device 170.

Figure 8:
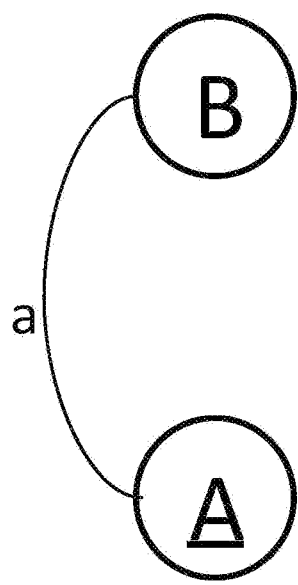
FIG. 8 is a multigraph representing the initial state of the map generation operation in Embodiment 1.

First, mobile apparatus 130 is placed at a starting point as illustrated in FIG. 7 (S101). In Embodiment 1, the starting point is where mobile apparatus 130 is connected to a charging station. Node detector 172 detects a path present in the vicinity of mobile apparatus 130 by path information obtaining device 136 (S102). What is recognized by map generation device 170 in this phase is illustrated as the multigraph in FIG. 8.

Since candidate node B is present at the end of the path detected (S104: Yes), mobile apparatus 130 travels, along untraveled path a detected by path information obtaining device 136, toward next candidate node B, based on driving device 132 (S105).

Figure 9:
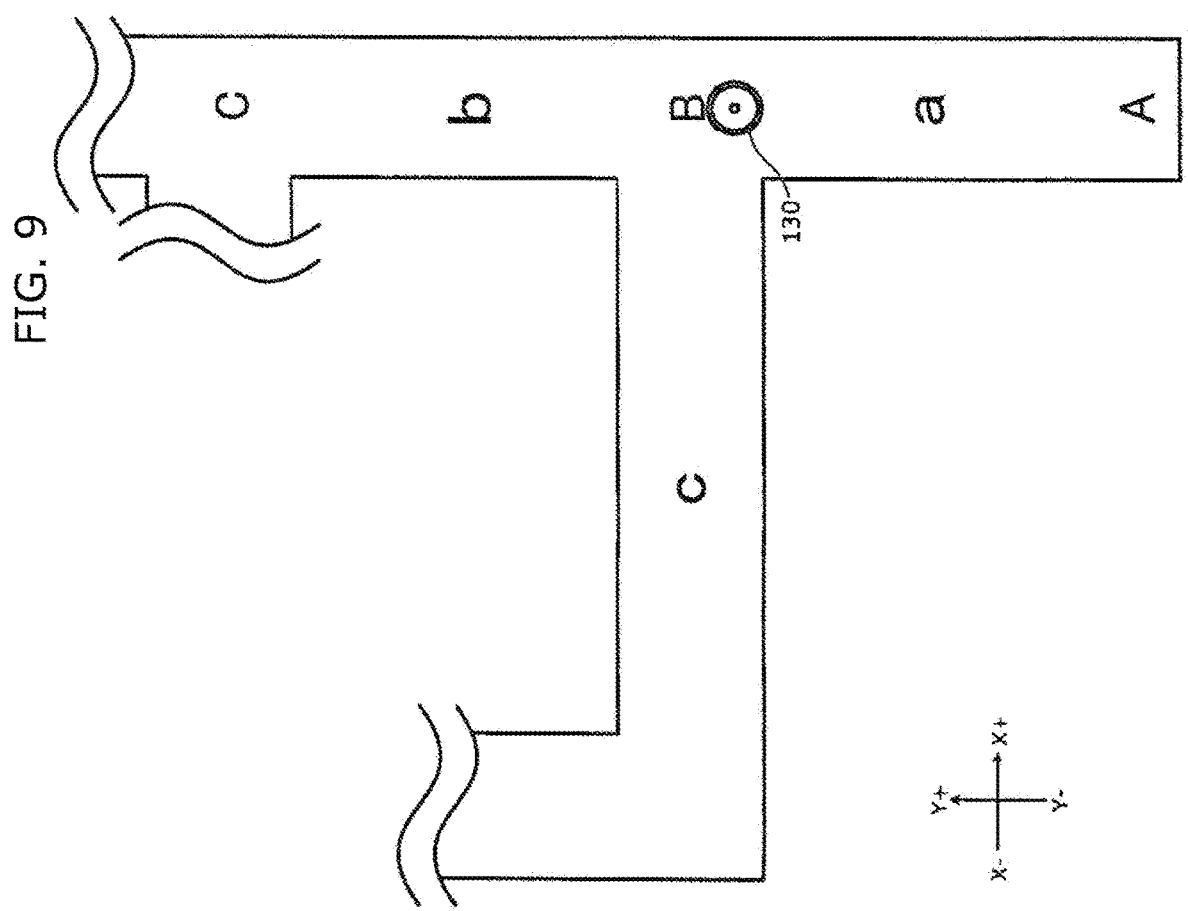
FIG. 9 illustrates phase 1 of the map generation operation in Embodiment 1.

As illustrated in FIG. 9, when mobile apparatus 130 reaches next candidate node B, node detector 172 detects node B and node determiner 174 determines whether the detected node matches a previously-reached node (S106). In this phase, since no corresponding previously-reached node exists, it is determined that there is no match (S106: No), and node information adder 176 adds, to a route map, detected node information as new previously-reached node information (S107).

Figure 5:
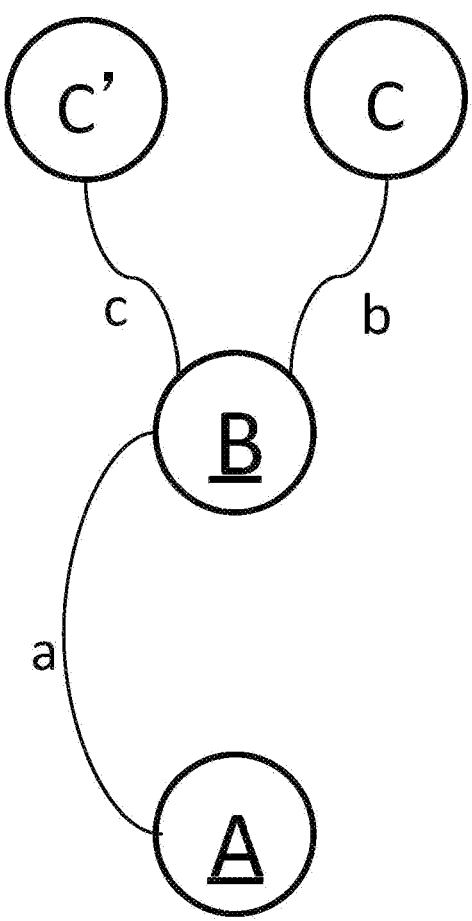
FIG. 5 is a multigraph recognized by the map generation device in Embodiment 1 during map generation.

As illustrated in FIG. 5, since two candidate nodes are present beyond node B in this phase (S104: Yes), mobile apparatus 130 travels to a next candidate node (S105). The state where a candidate node is present means the state where there is a possibility of the presence of a node at the end of an untraveled path. Although there are two untraveled paths each of which leads from node B to a different one of the two candidate nodes, movement instructor 175 selects, among the two untraveled paths, an untraveled path that requires fewer turns and causes mobile apparatus 130 to travel along the untraveled path selected. An error in the self-location of mobile apparatus 130 can be prevented by preventing mobile apparatus 130 from turning. In this phase, movement instructor 175 selects path b and causes mobile apparatus 130 to travel to a next candidate node.

Figure 10:
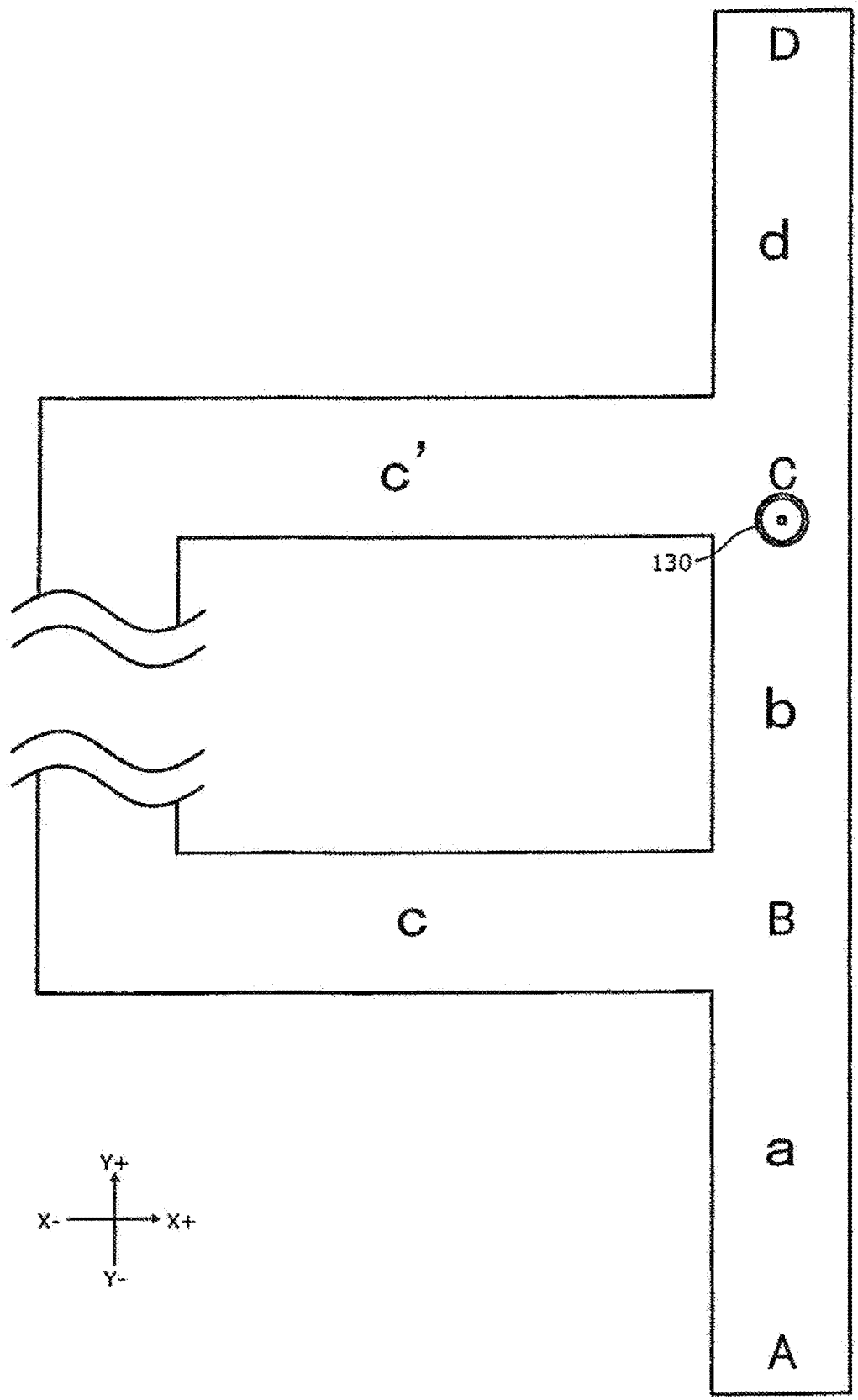
FIG. 10 illustrates phase 2 of the map generation operation in Embodiment 1.
Figure 11:
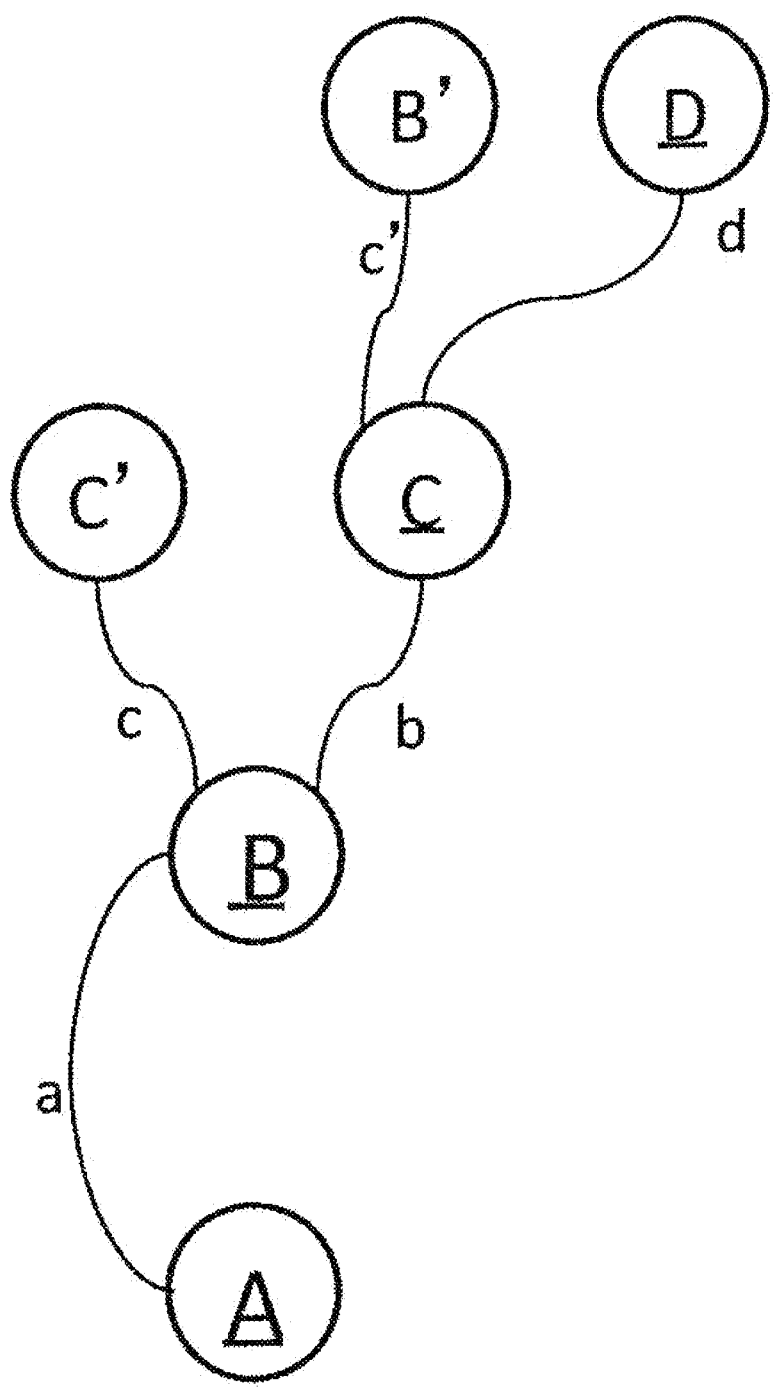
FIG. 11 is a multigraph representing phase 2 of the map generation operation in Embodiment 1.

As illustrated in FIG. 10, when mobile apparatus 130 reaches next candidate node C, node detector 172 detects node C and node determiner 174 determines whether the detected node matches a previously-reached node (S106). In this phase, since no corresponding previously-reached node exists, it is determined that there is no match (S106: No), and node information adder 176 adds, to the route map, detected node information as new previously-reached node information (S107). What is recognized by map generation device 170 in this phase is illustrated as the multigraph in FIG. 11.

Since there is still another candidate node (S104: Yes), mobile apparatus 130 travels to a next candidate node (S105). Although there are two untraveled paths each of which leads from node C to a different one of two candidate nodes, movement instructor 175 selects, among the two untraveled paths, an untraveled path that requires fewer turns and causes mobile apparatus 130 to travel along the untraveled path selected. In this phase, movement instructor 175 selects path d and causes mobile apparatus 130 to travel to a next candidate node.

Figure 12:
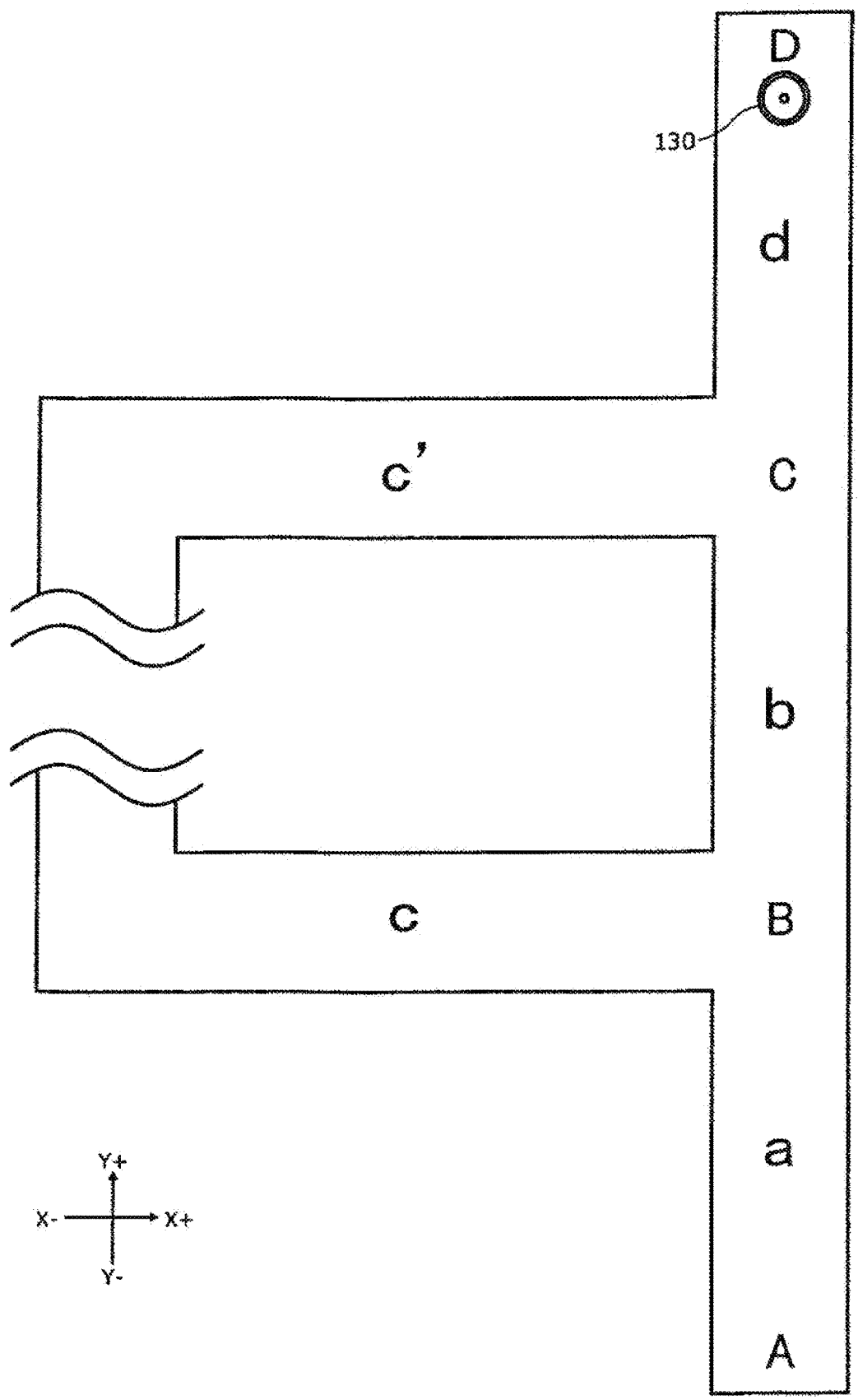
FIG. 12 illustrates phase 3 of the map generation operation in Embodiment 1.

As illustrated in FIG. 12, when mobile apparatus 130 reaches next candidate node D, node detector 172 detects node D and node determiner 174 determines whether the detected node matches a previously-reached node (S106). In this phase, since no corresponding previously-reached node information exists, it is determined that there is no match (S106: No), and node information adder 176 adds, to the route map, detected node information as new previously-reached node information (S107).

Since there is still another candidate node (S104: Yes), mobile apparatus 130 travels to a next candidate node (S105). A method of traveling to a next candidate node is not particularly limited, and movement instructor 175 controls driving device 132 to cause mobile apparatus 130 to travel to a candidate node connected to a previously-reached node that is located closest to the starting point. In the present embodiment, movement instructor 175 controls driving device 132 to cause mobile apparatus 130 to travel from node D, via nodes C and B, to node C' illustrated in FIG. 11.

Figure 13:
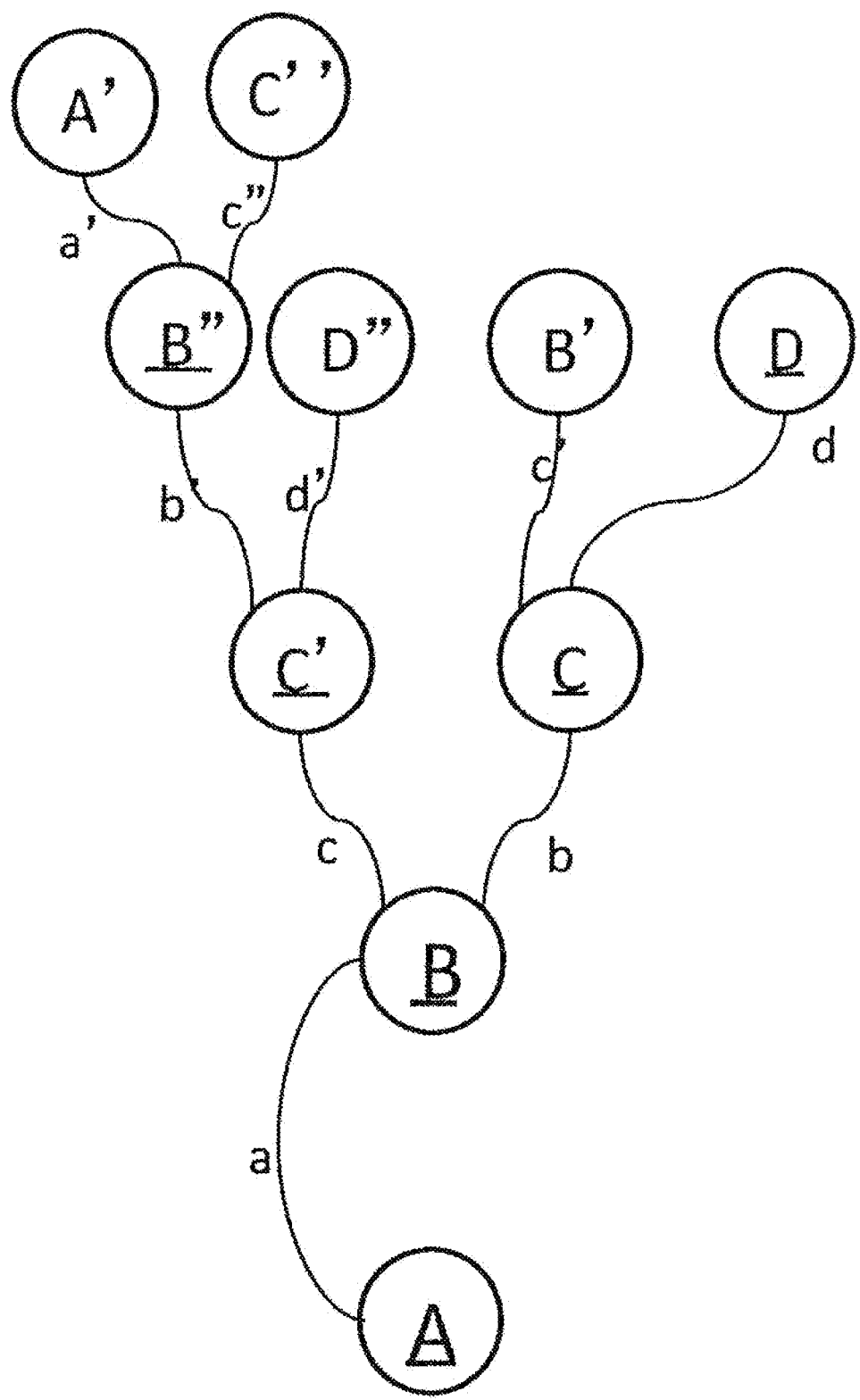
FIG. 13 is a multigraph representing phase 3 of the map generation operation in Embodiment 1.
Figure 14:
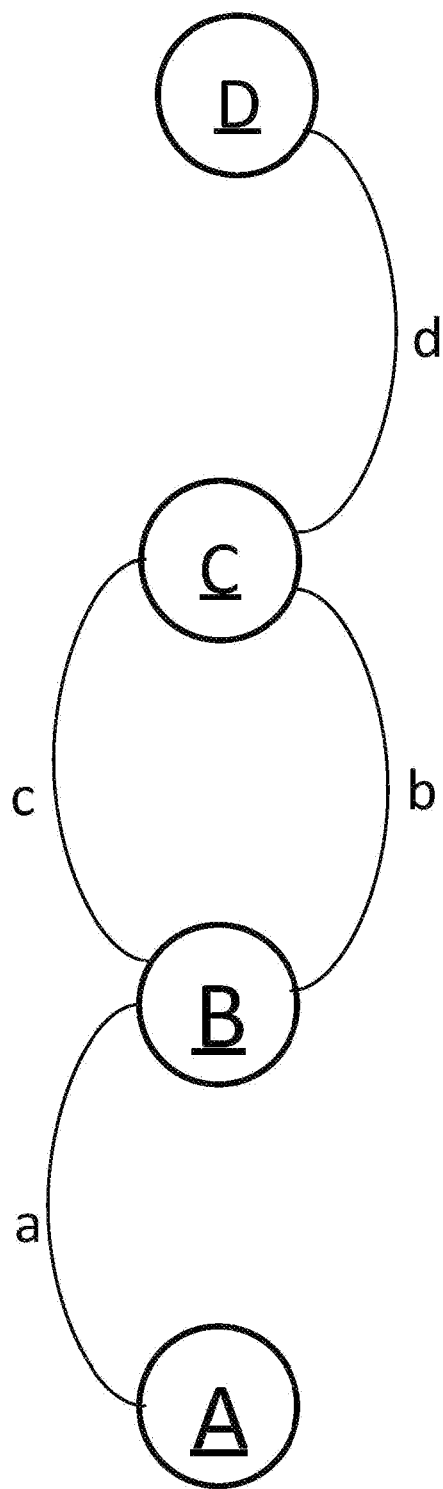
FIG. 14 is a multigraph after correction in Embodiment 1.

When mobile apparatus 130 reaches node C', node detector 172 detects the node. What is recognized by map generation device 170 in this phase is illustrated as the multigraph in FIG. 13. Node determiner 174 determines whether the detected node matches a previously-reached node (S106). In this phase, detected node C' and previously-reached node C are determined to match each other (S106: Yes). Accordingly, node B' that is a candidate node in FIG. 13 is determined to match node B and is no longer a candidate node, and the multigraph shown in FIG. 13 is corrected to the multigraph shown in FIG. 14. In other words, the detected node is determined to match a previously-reached node, and the multigraph is updated (S108). Then, no candidate node is left in FIG. 14 (S104: No), and the route map generation operation ends.

With mobile apparatus 130 according to the above-described embodiment, it is possible to generate, even for an untraveled area without a floor plan, a route map in which a topological expression of a path is accurate, by accurately recognizing the connection relationship between nodes by verifying the identity of a node reached via different paths. Particularly, it is possible to generate a more accurate route map when a map generation operation starts from a node that is a dead end, for example.

Embodiment 2

Next, Embodiment 2 of mobile apparatus 130 will be described. It should be noted that elements (parts) that achieve the same effects or functions as in Embodiment 1, and elements that have the same shapes, mechanisms, or structures as in Embodiment 1 are given the same reference signs as in Embodiment 1, and description thereof may be omitted. Moreover, the following will focus on the points of difference with Embodiment 1, and description of overlapping content may be omitted.

Map generation device 170 according to Embodiment 2 determines whether there is a previously-reached node having the same identity as a detected node, instead of determining whether a previously-reached node and a detected node match each other by node determiner 174 in Embodiment 1. Then, when node determiner 174 determines that there is a previously-reached node having the same identity as a detected node, node determiner 174 determines whether the previously-reached node and the detected node match each other by re-checking a marker disposed at a predetermined place. Thus, map generation device 170 according to Embodiment 2 is intended to improve the accuracy of a route map generated, and includes marker detection device 137, marker information obtainer 171, and marker determiner 177, in addition to the configuration in Embodiment 1.

A marker is an object that causes mobile apparatus 130 to recognize the location corresponding to the marker by recognizing the presence of the marker. The type of a marker is not particularly limited. In the present embodiment, a charging station that supplies power to mobile apparatus 130 is used as a marker. The location at which mobile apparatus 130 is connected to a charging station for charging is set as a home position (original position). Moreover, in Embodiment 2, a charging station as a marker is located at only one place within a route. It should be noted that there may be a plurality of charging stations that are markers.

Moreover, a marker may be an object including identification information. Furthermore, a way of carrying identification information is not particularly limited and, for example, an object including identification information can be exemplified by an object on which a one-dimensional or two-dimensional code is shown or an element capable of electromagnetically carrying identification information, such as a so-called radio frequency (RF) tag carrying identification information. Furthermore, a marker may be something whose shape or color itself functions as identification information or something to which a figure, text, pattern, magnetic pattern, or the like functioning as identification information is provided. For example, a marker may be a plate in the shape of a circle, triangle, or rectangle. Moreover, a marker may be any shape formed by a thing such as a wall, ceiling, ornament, lighting device, pattern, furniture, or home appliance present in the vicinity of mobile apparatus 130.

Furthermore, a marker may be a component that can be detached after generation of a route map. A marker may be a component that can be attached to a wall, door, furniture, or the like present in the vicinity of a path, or may be in a columnar or pyramid-like shape that can be placed on a floor or in a bar-like shape having a cross-section shaped like the letter L that can be placed on a floor at an angular part of a corner.

Figure 15:
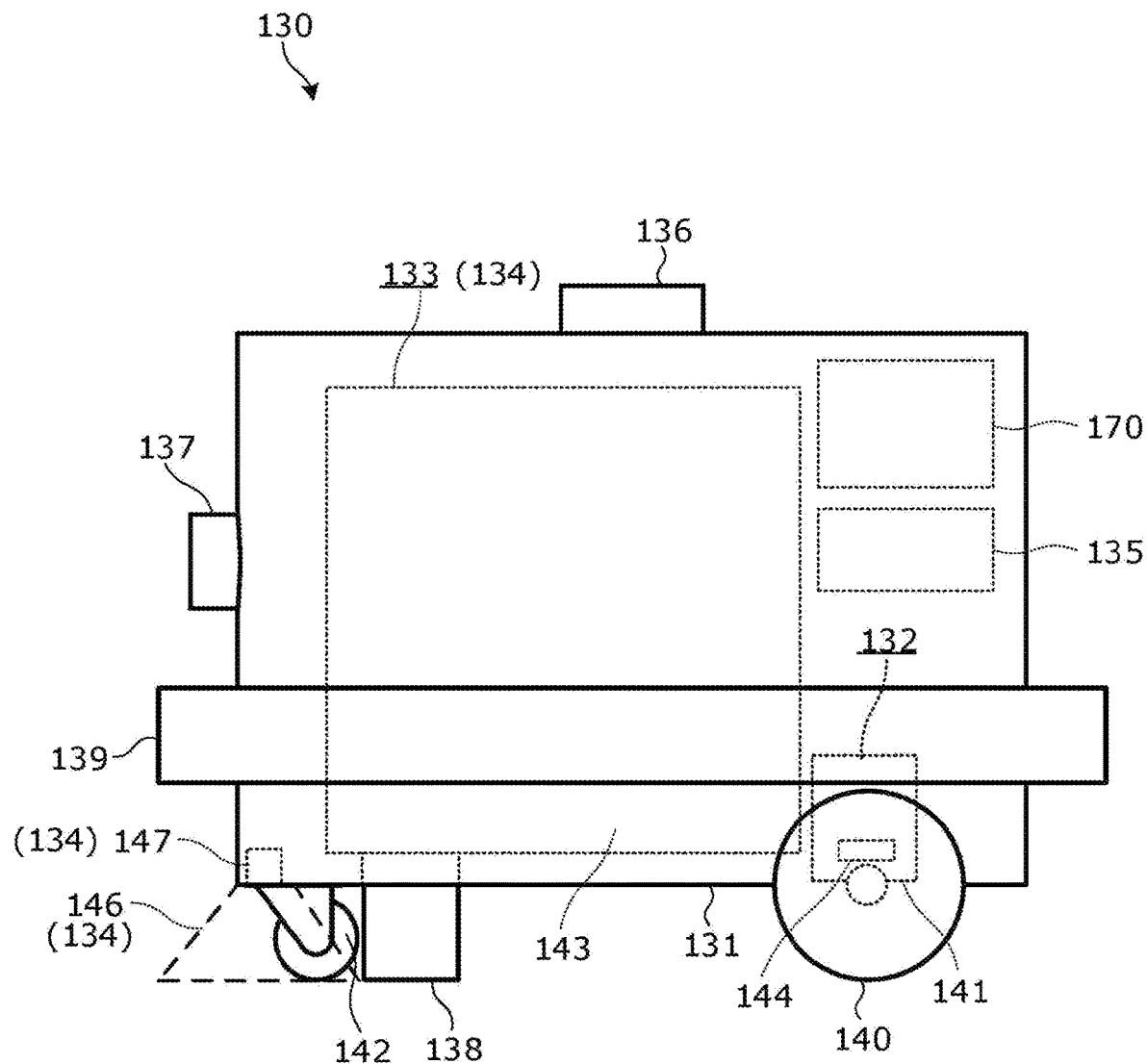
FIG. 15 is a side view illustrating the external appearance of a mobile apparatus according to Embodiment 2.

FIG. 15 is a side view illustrating the external appearance of mobile apparatus 130 according to Embodiment 2. Marker detection device 137 is a device that is attached to body 131 to thereby travel in conjunction with mobile apparatus 130 and detects a marker present in at least one place within a route. In Embodiment 2, marker detection device 137 detects a marker by recognizing that mobile apparatus 130 is connected to a charging station.

It should be noted that marker detection device 137 may detect identification information for identifying a marker detected. A method by which marker detection device 137 detects identification information is set according to the type of a marker and not particularly limited. For example, when a marker is something carrying and presenting identification information by a mark shown on its surface, a digital camera capable of detecting, as image data, the mark shown on the marker can be employed as marker detection device 137. Moreover, marker detection device 137 may read, by using laser light or the like, a code carried by a marker. When path information obtaining device 136 is capable of detecting identification information, path information obtaining device 136 may be caused to function as marker detection device 137.

Figure 16:
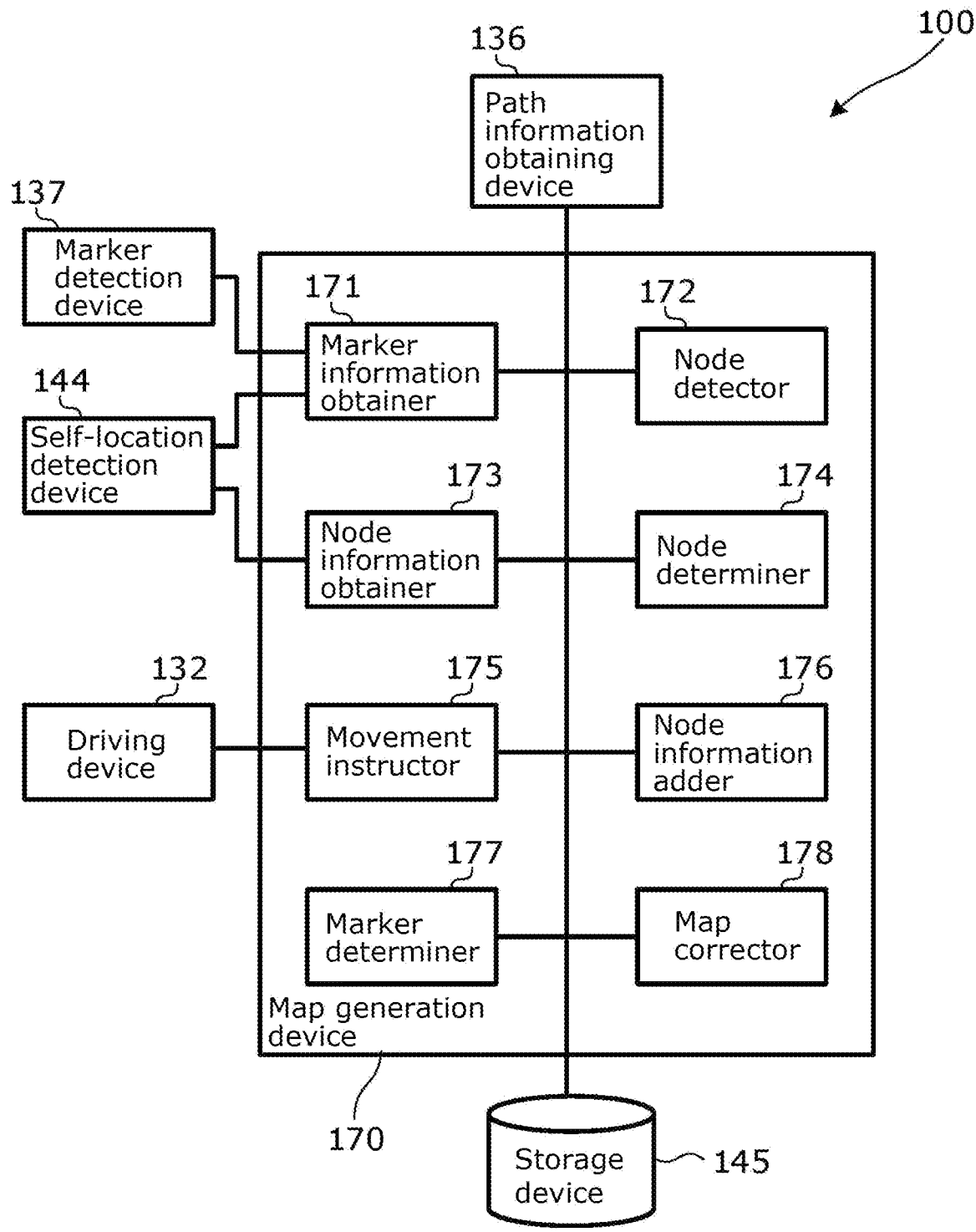
FIG. 16 is a block diagram illustrating each functional element of a map generation device in Embodiment 2.

FIG. 16 is a block diagram illustrating each functional element of map generation device 170 in Embodiment 2. Map generation device 170 in Embodiment 2 includes marker information obtainer 171 and marker determiner 177, in addition to the processing units described in Embodiment 1.

Marker information obtainer 171 obtains marker information including information indicating whether a marker has been detected by marker detection device 137. Marker information obtainer 171 causes storage device 145 to store the marker information obtained. In the present embodiment, marker information includes information indicating whether a marker has been detected and the location at which the marker has been detected.

It should be noted that when a marker is a shape or the like defined by a wall, furniture, or the like present in the vicinity of a path, i.e., when the wall, furniture, or the like present in the vicinity of a path are considered to be a marker, marker information obtainer 171 may obtain the shape or the like in the vicinity of mobile apparatus 130 from path information obtaining device 136 and/or marker detection device 137 and generate identification information that can distinguish the shape or the like from other places.

Marker determiner 177 determines whether searched marker information that is marker information obtained through a search and known marker information that is previously-obtained marker information match each other. Although a determining method is not particularly limited, in Embodiment 2, since a marker is a single charging station only, when mobile apparatus 130 is connected again to the charging station through a search, searched marker information and known marker information are determined to match each other. It should be noted that, when marker information cannot be obtained through a search, marker determiner 177 determines that searched marker information and known marker information do not match each other.

It should be noted that marker determiner 177 may obtain, from a marker found through a search, identification information included in searched marker information by marker detection device 137, and compare the identification information included in the searched marker information with identification information included in known marker information corresponding to a previously-reached node stored in storage device 145, and then, when the identification information included in the searched marker information and the identification information included in the known marker information match each other, marker determiner 177 may determine that the searched marker information and the known marker information match each other.

Figure 17:
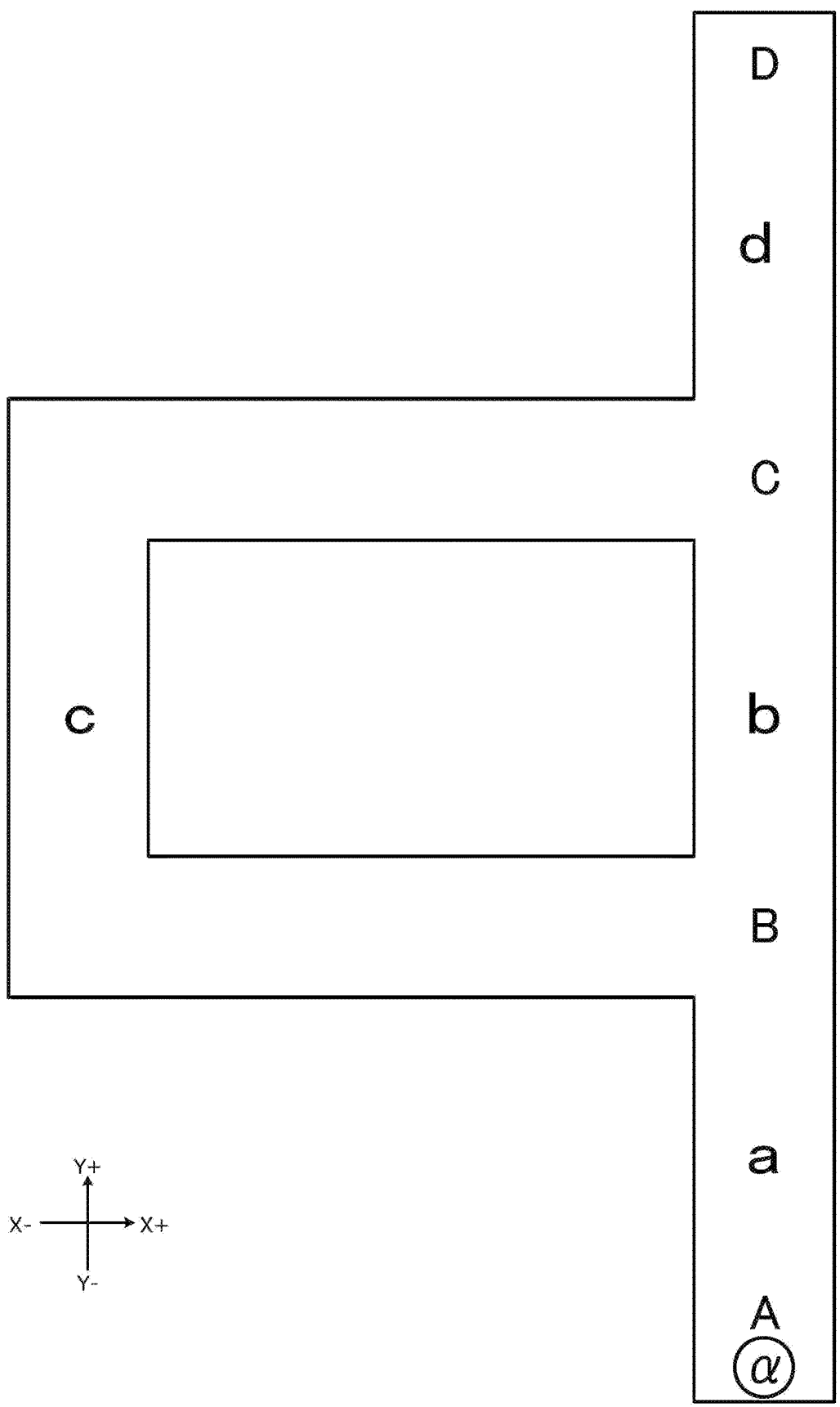
FIG. 17 illustrates a route that is a target for route map generation in Embodiment 2.

As with FIG. 4 in Embodiment 1, FIG. 17 illustrates a whole route that is a target for route map generation. Moreover, the circled Greek letter a in FIG. 17 represents a marker.

When node determiner 174 determines that there is a previously-reached node having the same identity as a detected node, movement instructor 175, which controls driving device 132 to cause mobile apparatus 130 to travel, outputs, to driving device 132, a search instruction for causing mobile apparatus 130 to travel so as to search a marker. A trigger for causing movement instructor 175 to output a search instruction may be that node determiner 174 determines that there is a previously-reached node having the same identity as a detected node.

When a marker cannot be recognized through a search based on an instruction by movement instructor 175 or when marker determiner 177 determines that searched marker information and known marker information do not match each other, node information adder 176 adds, to a route map, detected node information as new previously-reached node information.

When marker determiner 177 determines that there is a match, map corrector 178 determines that a node corresponding to detected node information and a node corresponding to previously-reached node information, which have been determined by node determiner 174, are the same, and corrects a route map.

Figure 18:
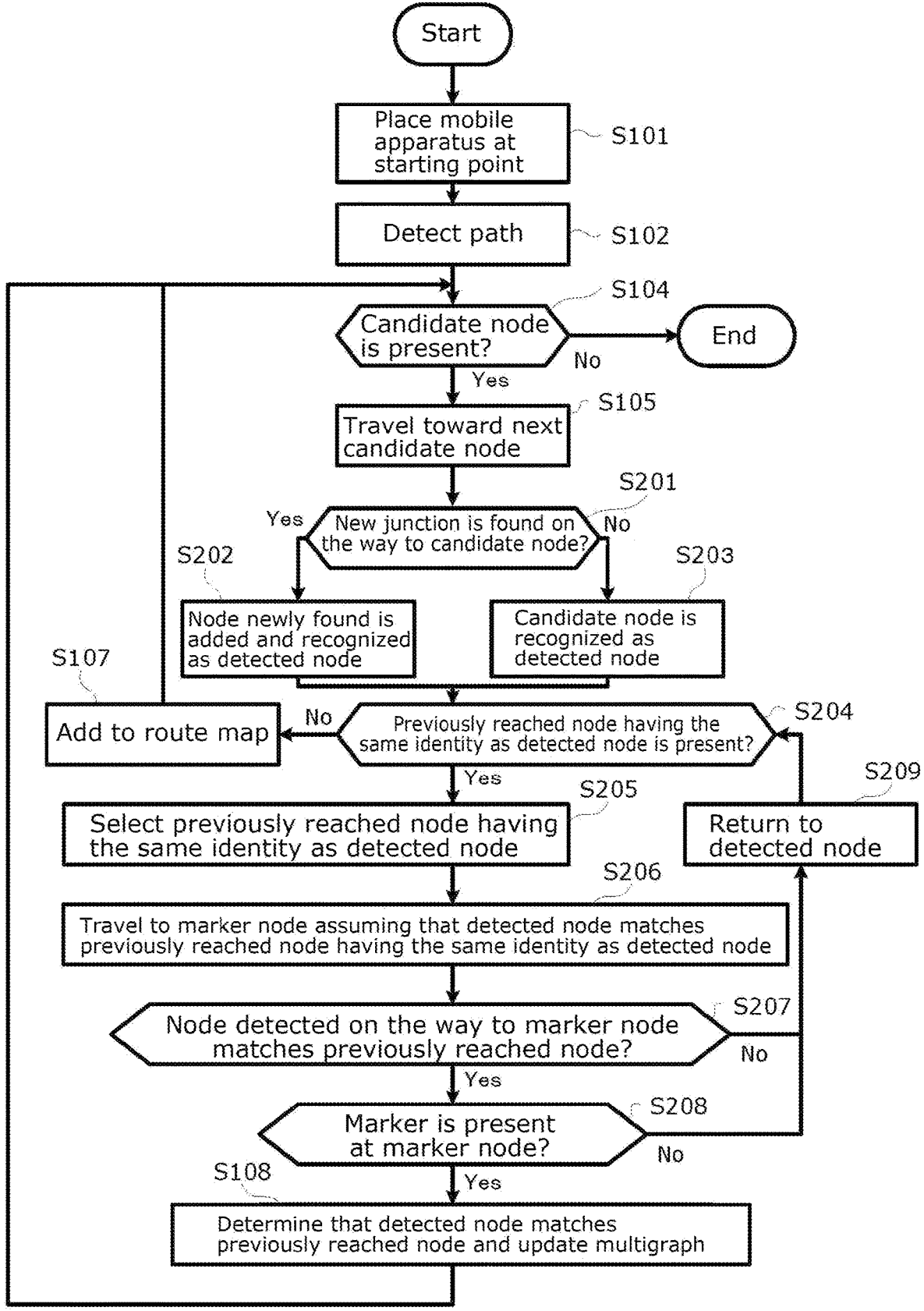
FIG. 18 is a flowchart illustrating a flow of operations performed by the map generation device in Embodiment 2.

Next, a route map generation operation performed by map generation device 170 included in mobile apparatus 130 will be described. FIG. 18 is a flowchart illustrating a flow of operations performed by map generation device 170 according to Embodiment 2. It should be noted that description of a process similar to Embodiment 1 may be omitted.

Figure 19:
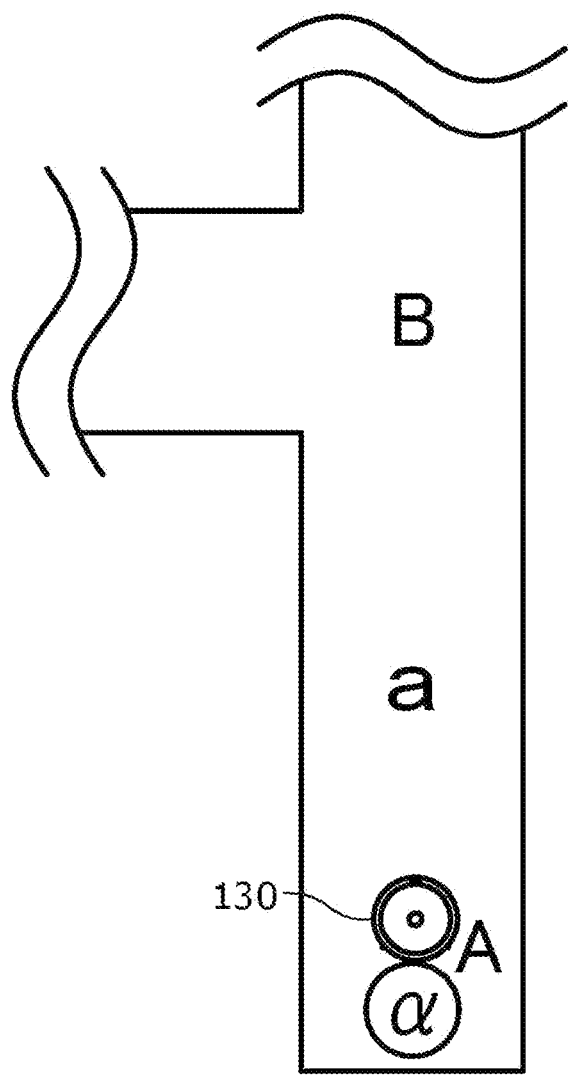
FIG. 19 illustrates the initial state of a map generation operation in Embodiment 2.

First, mobile apparatus 130 is placed at a starting point as illustrated in FIG. 19 (S101). In Embodiment 2, the starting point is where mobile apparatus 130 is connected to a charging station that functions as marker α. Marker information obtainer 171 recognizes marker α and stores, as known marker information, the location at which marker α has been recognized. In the present embodiment, marker information obtainer 171 stores, as known marker information, a reference position (e.g., original position) that is the location of mobile apparatus 130 connected to the charging station.

Node detector 172 detects a path present in the vicinity of mobile apparatus 130 by path information obtaining device 136 (S102). What is recognized by map generation device 170 in this phase is illustrated as the multigraph in FIG. 8. Since candidate node B is present at the end of the path detected (S104: Yes), mobile apparatus 130 travels, along untraveled path a detected by path information obtaining device 136, toward next candidate node B, based on driving device 132 (S105).

When a new junction is found by path information obtaining device 136 on the way to the candidate node (S201: Yes), the node newly found is added as an unvisited node and the node newly found is recognized as a detected node (S202). When no new junction is found on the way to the candidate node (S201: No), the candidate node is recognized as a detected node (S203).

When mobile apparatus 130 reaches the detected node, node determiner 174 determines whether there is a previously-reached node having the same identity as the detected node in an area based on a distance threshold value (S204). It should be noted that when self-location detection device 144 can calculate the standard deviation of errors in self-location detection of mobile apparatus 130, self-location detection device 144 obtains a distance between the detected node and a previously-reached node. When a distance between the detected node and a previously-reached node is not more than three times the standard deviation of errors in self-location detection of mobile apparatus 130, in step S204, node determiner 174 determines that there is a previously-reached node having the same identity as the detected node. When there is no previously-reached node having the same identity as the detected node (S204: No), node information adder 176 adds the detected node as a new previously-reached node (S107). When there is one or more previously-reached nodes each having the same identity as the detected node (S204: Yes), node determiner 174 selects a previously-reached node from the one or more previously-reached nodes each having the same identity as the detected node (S205).

The previously-reached node having the same identity as the detected node is a previously-reached node for which node information that is the same as node information of the detected node obtained by node information obtainer 173 is stored. For example, the previously-reached node having the same identity as the detected node is a previously-reached node connected to the same number of paths as the number of paths connected to the detected node or a previously-reached node connected to the same path as the detected node.

Next, assuming that the detected node matches the previously-reached node having the same identity as the detected node, movement instructor 175 outputs, to mobile apparatus 130, a search instruction for searching for a marker at a node where a marker is present (hereinafter and in the Drawings, referred to as "marker node"), and mobile apparatus 130 travels to the marker node (S206). When a node is detected on the way to the marker node, node determiner 174 determines whether the node detected on the way to the marker node matches a previously-reached node present between the marker node and the previously-reached node selected in the route map and having the same identity as the detected node (S207). When it is determined that there is no match (S207: No), mobile apparatus 130 returns to the detected node (S209), and node determiner 174 again performs step S204 for determining whether there is a previously-reached node having the same identity as the detected node.

When node determiner 174 determines that the node detected on the way to the marker node matches a previously-reached node present between the marker node and the previously-reached node selected in the route map and having the same identity as the detected node (S207: Yes), mobile apparatus 130 reaches a node assumed to be the marker node and searches for a marker. When there is no marker at the node reached (S208: No), mobile apparatus 130 returns to the detected node (S209) and performs step S204 again. It should be noted that the state where there is no marker includes the state where marker detection device 137 cannot detect a marker and the state where marker detection device 137 detects a marker but searched marker information obtained by marker information obtainer 171 does not match known marker information previously obtained. In the present embodiment, since there is only a single marker that is the charging station, there is no case where marker information does not match each other.

When a marker is present at the node assumed to be the marker node (S208: Yes), that is, when marker information of a marker found through a search is obtained by marker information obtainer 171 via marker detection device 137 and searched marker information that is the marker information obtained matches known marker information that is marker information previously obtained, the marker node and a previously-reached node are determined to match each other and the multigraph is updated (S108). Then, the process goes back to determination of whether there is a candidate node (S104). By repeating the above-described processes until no candidate node is left, a more accurate multigraph can be obtained.

Depending on the state of a floor on which mobile apparatus 130 travels, a major error may possibly be included in the self-location detected by self-location detection device 144. In the present embodiment, since whether an error is present or not is determined based on a marker, the topology of a real route can be more accurately reproduced on a route map.

Embodiment 3

Next, another embodiment of mobile apparatus 130 will be described. By providing a marker to every node, mobile apparatus 130 according to Embodiment 3 makes a distance traveled for detecting a marker shorter than that in Embodiment 2. It should be noted that elements (parts) that achieve the same effects and/or functions as those in Embodiment 1 or 2, and elements that have the same shapes, mechanisms, or structures as in Embodiment 1 or 2 are given the same reference signs as in Embodiment 1 or 2, and description thereof may be omitted. Moreover, the following will focus on the points of difference with Embodiment 1 or 2, and description of overlapping content may be omitted.

Figure 20:
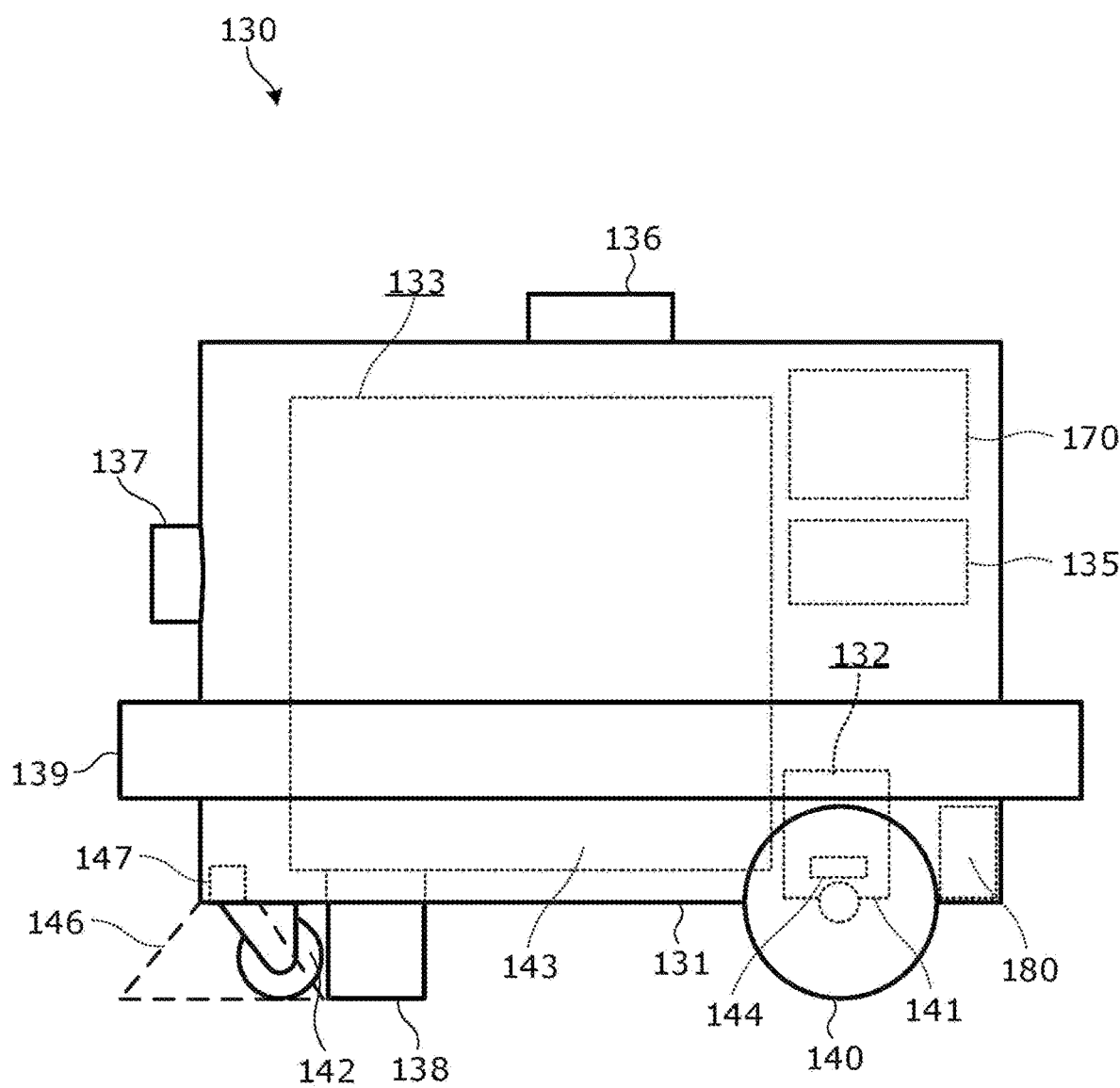
FIG. 20 is a side view illustrating the external appearance of a mobile apparatus according to Embodiment 3.
Figure 21:
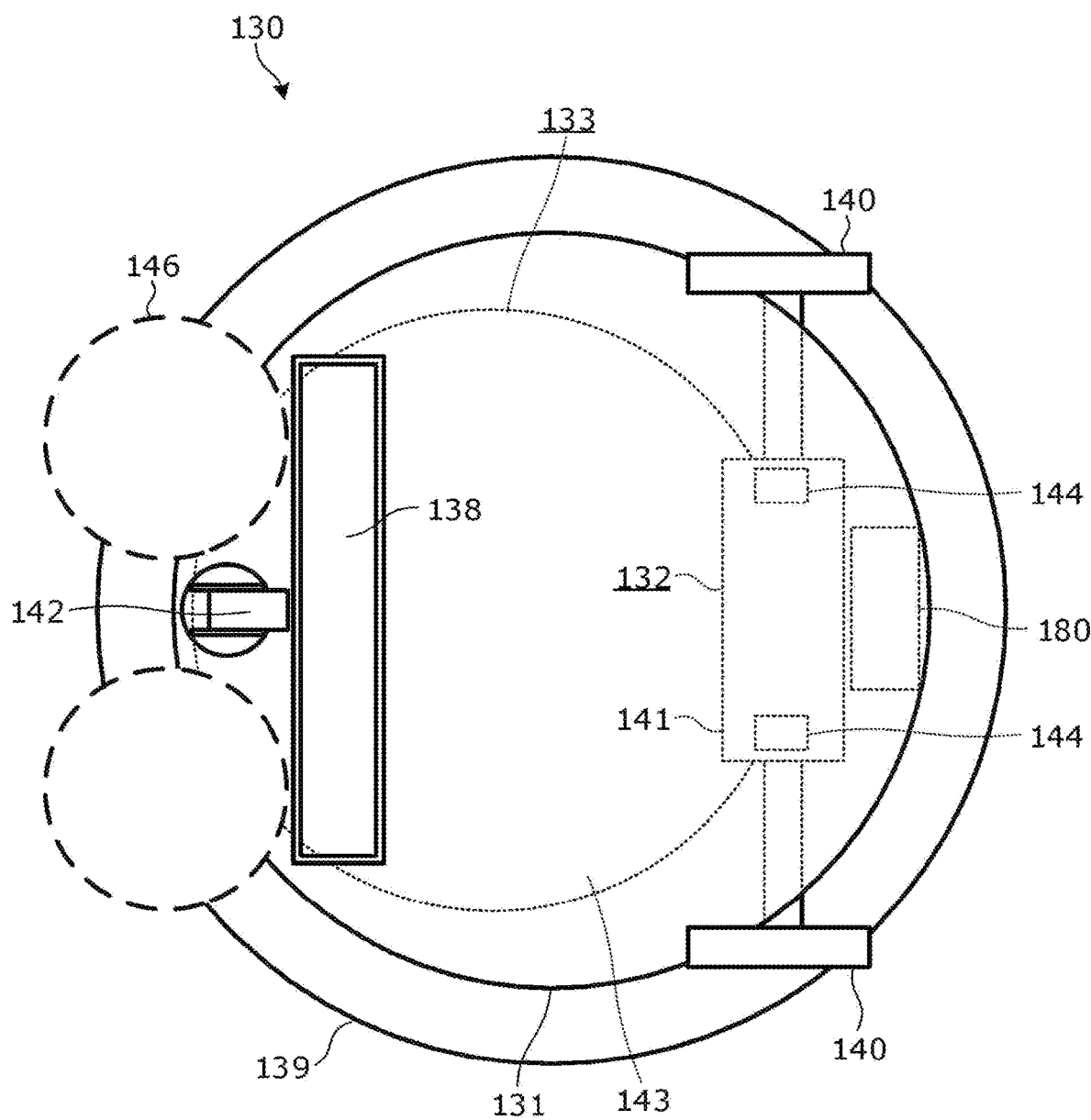
FIG. 21 is a bottom view illustrating the external appearance of the mobile apparatus according to Embodiment 3.

FIG. 20 is a side view illustrating the external appearance of mobile apparatus 130 according to Embodiment 3. FIG. 21 is a bottom view illustrating the external appearance of mobile apparatus 130 according to Embodiment 3. In Embodiment 3, mobile apparatus 130 includes marker provision device 180 in addition to mobile apparatus 130 described in Embodiment 2.

Marker provision device 180 is a device that provides a marker to a node. The structure of marker provision device 180 is not particularly limited. In the present embodiment, marker provision device 180 holds a plurality of card-like markers each of which carries identification information. When obtaining provision instruction information, marker provision device 180 provides a marker on a floor by discharging one of the cards to the outside of body 131.

It should be noted that marker provision device 180 may cause a marker, which is to be discharged, to carry location information relating to self-location or the like. As a specific example, marker provision device 180 may include a printing means and cause a marker, which is to be discharged, to carry various information by printing, on the marker, a two-dimensional code including identification information and location information, or the like.

Figure 22:
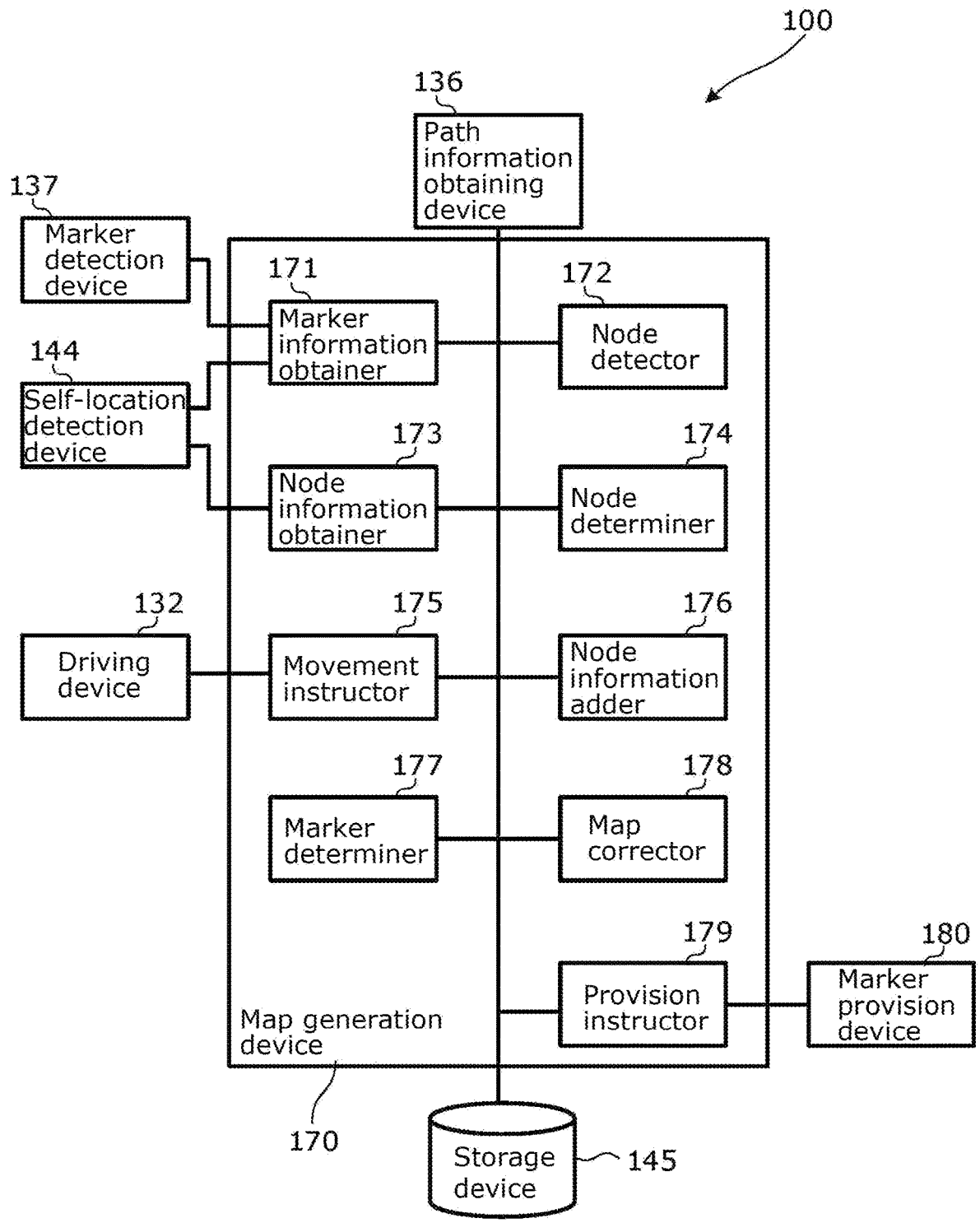
FIG. 22 is a block diagram illustrating each functional element of a map generation device in Embodiment 3.

FIG. 22 is a block diagram illustrating each functional element of map generation device 170 in Embodiment 3. Map generation device 170 according to Embodiment 3 includes provision instructor 179 as a processing unit, in addition to the processing units of map generation device 170 according to Embodiment 2.

When node information adder 176 adds previously-reached node information to a route map, provision instructor 179 outputs, to marker provision device 180, provision instruction information for providing a marker to a corresponding node.

It should be noted that provision instructor 179 may control driving device 132 via movement instructor 175 so that a position where a marker is provided is a predetermined position (e.g., position as close as possible to the center of a node). Moreover, provision instructor 179 does not necessarily provide a marker to every node added as previously-reached node information to a route map by node information adder 176.

Figure 23:
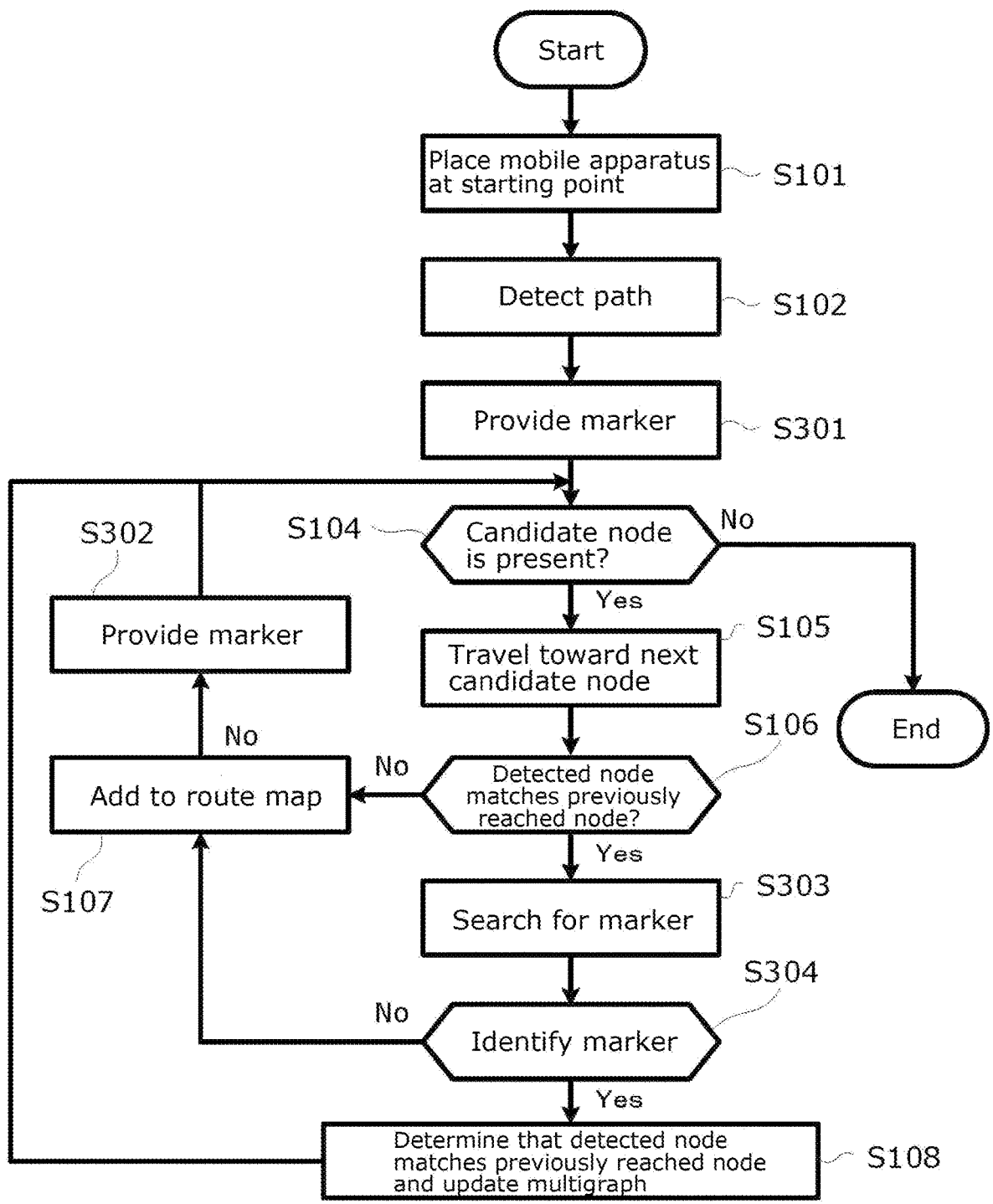
FIG. 23 is a flowchart illustrating a flow of operations performed by the map generation device in Embodiment 3.

Next, a route map generation operation performed by map generation device 170 included in mobile apparatus 130 according to Embodiment 3 will be described. FIG. 23 is a flowchart illustrating a flow of operations performed by map generation device 170 according to Embodiment 3.

Figure 24:
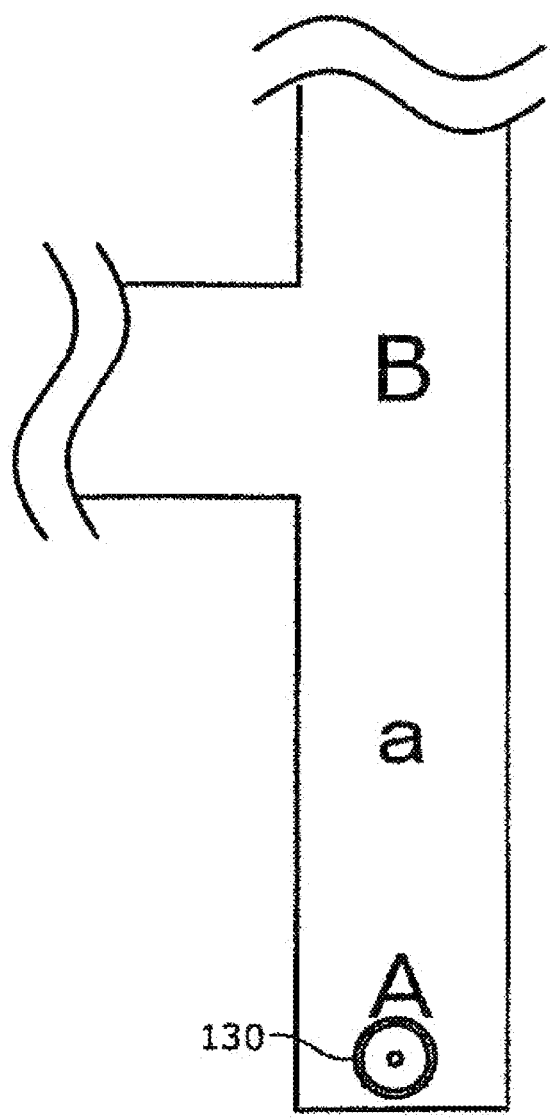
FIG. 24 illustrates the initial state of a map generation operation in Embodiment 3.

First, mobile apparatus 130 is placed at a starting point as illustrated in FIG. 24 (S101). Node detector 172 detects a path present in the vicinity of mobile apparatus 130 by path information obtaining device 136 (S102). Since the starting point is a node that is a dead end, provision instructor 179 causes marker provision device 180 to provide marker α to node A as illustrated in FIG. 25 (S301).

Since candidate node B is present (S104: Yes), mobile apparatus 130 travels toward next candidate node B detected by path information obtaining device 136, based on driving device 132 (S105).

Figure 26:
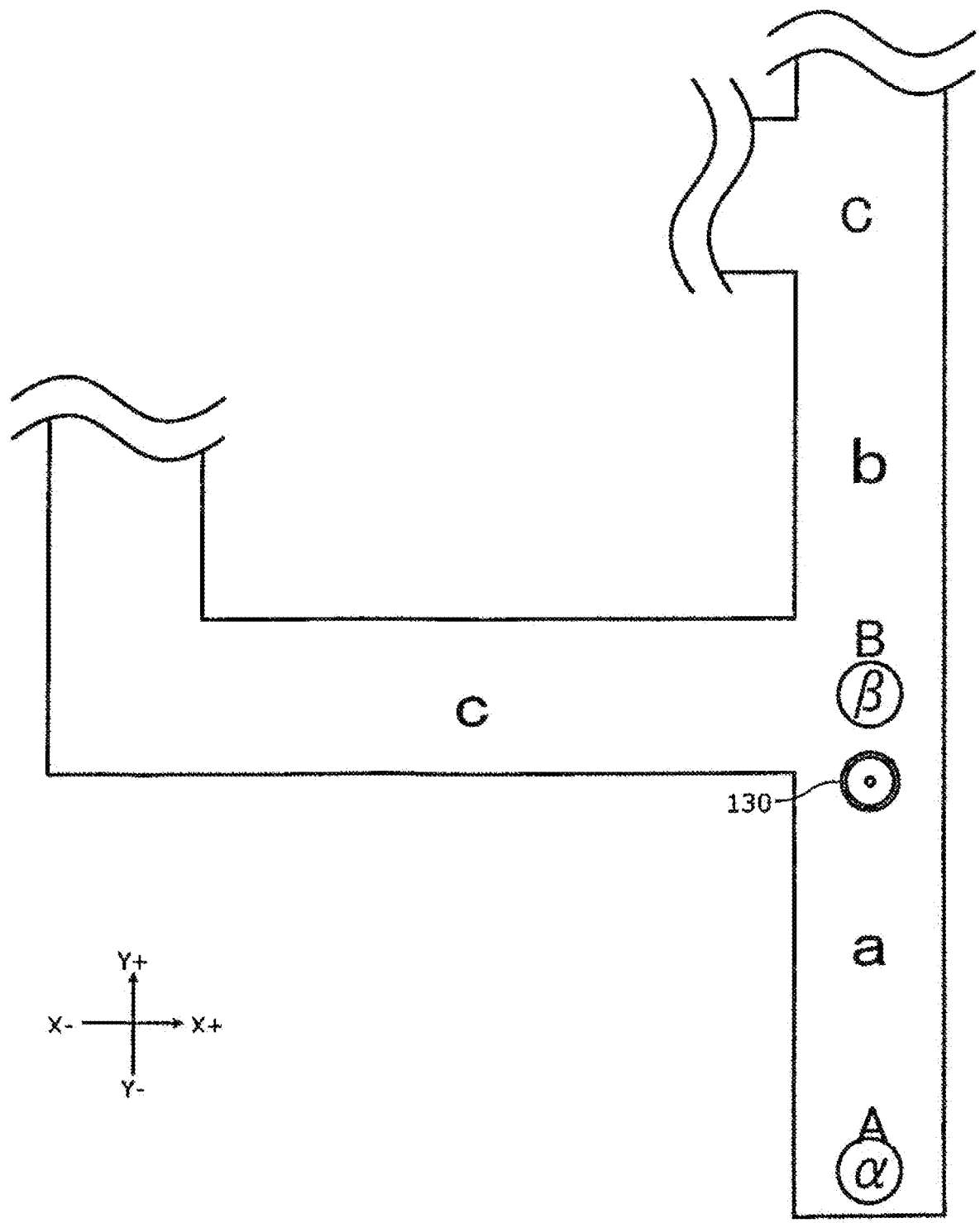
FIG. 26 illustrates phase 2 of the map generation operation in Embodiment 3.

As illustrated in FIG. 26, when mobile apparatus 130 reaches next candidate node B, node detector 172 detects node B and node determiner 174 determines whether the detected node matches a previously-reached node (S106). In this phase, since no corresponding previously-reached node exists, node information adder 176 adds, to a route map, detected node information as new previously-reached node information (S107). Moreover, provision instructor 179 causes marker provision device 180 to provide marker R to node B, as illustrated in FIG. 26 (S302).

Since there is still another candidate node (S104: Yes), mobile apparatus 130 travels to a next candidate node (S105). Movement instructor 175 selects, as first priority, an untraveled path that requires fewer turns, and causes mobile apparatus 130 to travel along the untraveled path selected. An error in the self-location can be prevented by preventing mobile apparatus 130 from turning. In this phase, movement instructor 175 selects path b and causes mobile apparatus 130 to travel to a next candidate node.

Figure 27:
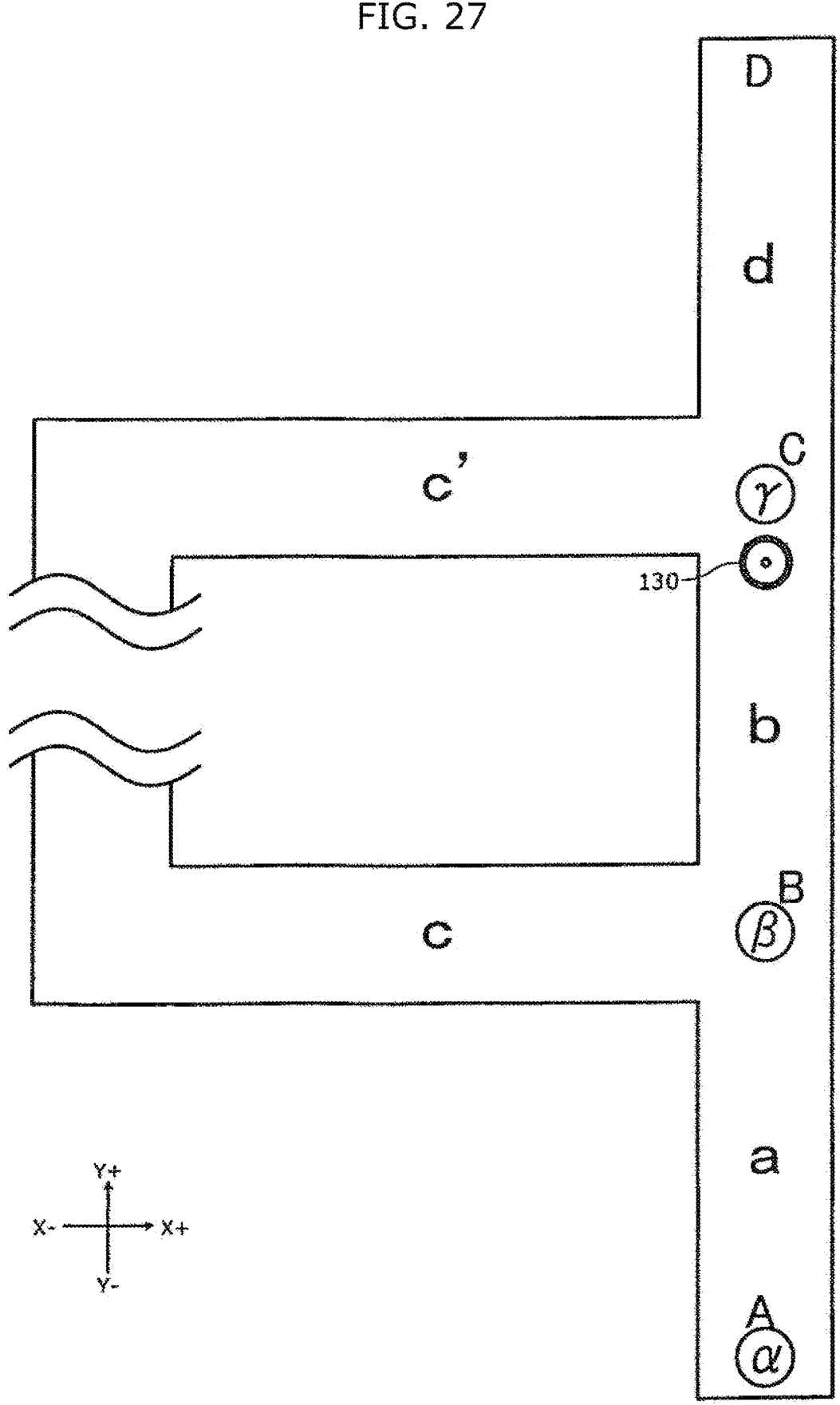
FIG. 27 illustrates phase 3 of the map generation operation in Embodiment 3.

As illustrated in FIG. 27, when mobile apparatus 130 reaches next candidate node C, node detector 172 detects node C and node determiner 174 determines whether the detected node matches a previously-reached node (S106). In this phase, since no previously-reached node corresponding to node C exists, node information adder 176 adds, to the route map, detected node information as new previously-reached node information (S107). Moreover, provision instructor 179 causes marker provision device 180 to provide marker γ as illustrated in FIG. 27 (S302).

Since there is still another candidate node (S104: Yes), mobile apparatus 130 travels to a next candidate node (S105). Although there are two untraveled paths each of which leads from node C, which has been provided with marker γ, to next candidate node D, movement instructor 175 selects, among the two untraveled paths, an untraveled path that requires fewer turns and causes mobile apparatus 130 to travel along the untraveled path selected. In this phase, movement instructor 175 selects path d and causes mobile apparatus 130 to travel to candidate node D.

Figure 28:
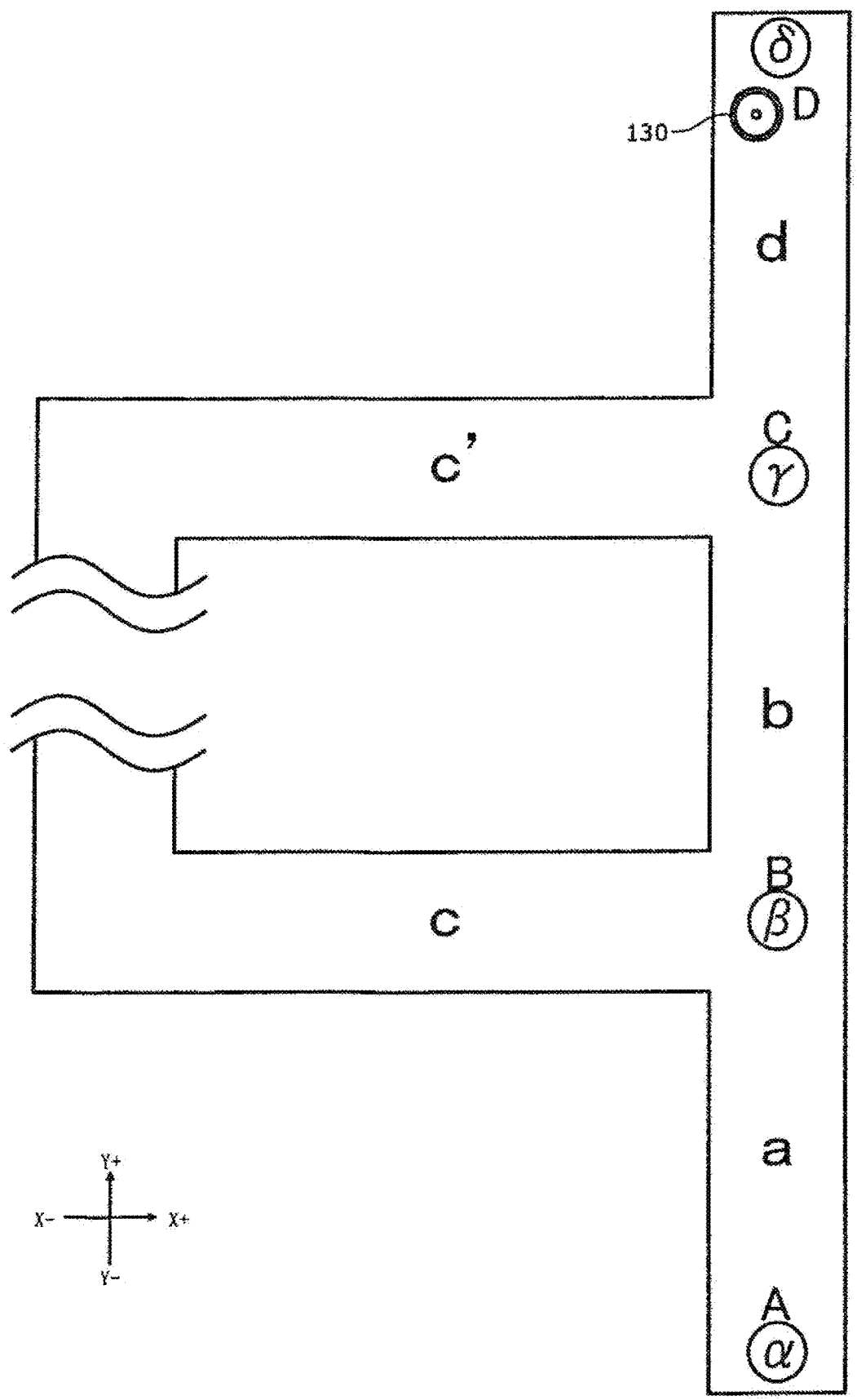
FIG. 28 illustrates phase 4 of the map generation operation in Embodiment 3.

As illustrated in FIG. 28, when mobile apparatus 130 reaches next candidate node D, node detector 172 detects node D and node determiner 174 determines whether the detected node matches a previously-reached node (S106). In this phase, since no corresponding previously-reached node exists, node information adder 176 adds, to the route map, detected node information as new previously-reached node information (S107). Moreover, provision instructor 179 causes marker provision device 180 to provide marker δ as illustrated in FIG. 28 (S302).

In this phase, although it can be seen that mobile apparatus 130 has reached all nodes on the drawing, since map generation device 170 of mobile apparatus 130 recognizes the presence of untraveled paths connected to nodes B and C and the presence of a candidate node at the end of each of the untraveled paths (S104: Yes), mobile apparatus 130 moves to a next candidate node (S105). In this phase, since mobile apparatus 130 has reached node D that is a dead end, movement instructor 175 causes mobile apparatus 130 to retrace the path already traveled and travel to node C. Node detector 172 detects a node and node determiner 174 determines whether the detected node is a previously-reached node (S106). Since node C is a previously-reached node, movement instructor 175 causes mobile apparatus 130 to travel so as to search for marker γ (S303). Marker determiner 177 determines whether marker γ matches a marker of the previously-reached node, based on marker information obtained from marker γ as a result of the search (S304). When the marker determination result indicates that there is a match (S304: Yes), that is, when the marker information of marker γ found through the search is obtained by marker information obtainer 171 via marker detection device 137 and searched marker information that is the marker information obtained matches known marker information that is marker information previously obtained, the detected node and the previously-reached node are determined to match each other and the multigraph is updated (S108). Then, the process goes back to determination of whether there is a candidate node (S104). By repeating the above-described processes until no candidate node is left, a more accurate multigraph can be obtained. It should be noted that a search for a marker may be unnecessary when a route map does not need to be corrected since there is no junction between node D and node C.

As with the above, since there is still another candidate node (S104: Yes), mobile apparatus 130 travels to a next candidate node (S105). In this phase, although mobile apparatus 130 is present at node C to which an untraveled path is connected, since node B' to which an untraveled path is connected is also present, movement instructor 175 causes mobile apparatus 130 to retrace the path already traveled (path defined by previously-reached nodes) and travel to node B that is located closest to the starting point among nodes to each of which an untraveled path is connected. In this phase, movement instructor 175 selects path b and causes mobile apparatus 130 to travel to node B. Node detector 172 detects a node and node determiner 174 determines whether the detected node matches a previously-reached node (S106). Since node B matches a previously-reached node, movement instructor 175 causes mobile apparatus 130 to travel so as to search for marker β (S303). Marker determiner 177 determines whether marker β matches a marker of the previously-reached node, based on information obtained from marker β as a result of the search (S304), and when there is a match, the multigraph is updated (S108).

Assuming that there is a candidate node at the end of an untraveled path connected to node B that is located closest to the starting point (S104: Yes), mobile apparatus 130 travels to a next candidate node (S105). In this phase, since mobile apparatus 130 has reached node B that is located closest to the starting point and connected to an untraveled path, movement instructor 175 causes mobile apparatus 130 to travel so as to pass through untraveled path c. It should be noted that, although movement instructor 175 has selected untraveled path c since only untraveled path c is left as an untraveled path connected to node B in the present embodiment, when a plurality of untraveled paths are left as untraveled paths connected to node B, movement instructor 175 preferentially selects, among the untraveled paths, an untraveled path along which mobile apparatus 130 can travel with a small turning angle. Mobile apparatus 130 turns two corners along the untraveled path selected and reaches a node detected by node detector 172. Node determiner 174 determines whether the detected node is a previously-reached node (S106). Node determiner 174 determines that the detected node is previously-reached node C. Movement instructor 175 causes mobile apparatus 130 to travel so as to search for marker γ (S303). Marker determiner 177 determines whether marker γ matches a marker of previously-reached node C, based on information obtained from marker γ as a result of the search (S304), and when there is a match (S304: Yes), the multigraph is updated (S108).

When marker determiner 177 determines that there is no match (S304: No), node information adder 176 adds, to the route map, detected node information as previously-reached node information (S107). Moreover, provision instructor 179 causes marker provision device 180 to provide a marker (S302).

The above-described flow is repeated until no candidate node is left (S104: No), and the flow ends.

It should be noted that when mobile apparatus 130 travels to a candidate node via untraveled path c from node B and the candidate node is not determined to be node C, there is still another candidate node. Therefore, mobile apparatus 130 returns to node B, travels to node C, and then travels from node C to a candidate node via untraveled path c'. Here, when the candidate node is determined to be node B, the route map is corrected and an inconsistency is resolved. When the candidate node is not determined to be node B, the same processes are repeated since there is still another candidate node.

With mobile apparatus 130 according to Embodiment 3 above, the identity of each of nodes to which mobile apparatus 130 has reached via different paths is verified based on a marker. Accordingly, it is possible to generate, even for an untraveled area without a floor plan, a route map in which a topological expression of a path is accurate, by generating the route map while accurately recognizing the connection relationship between nodes.

Moreover, by causing mobile apparatus 130 to recognize a node and provide a marker to a node reached, a route map can be generated automatically and efficiently without the need for a worker to provide a marker to a node in advance, for example.

Furthermore, since it is possible to provide a marker to each of nodes reached and accurately verify the identity of each of the nodes by the marker, a route map can be generated in a short period of time even for a complicated route by omitting an operation such as returning to a marker of the starting point.

It should be noted that the present disclosure is not limited to the above-described embodiments. For example, constituent elements recited in the present description may be combined as desired and/or one or more constituent elements may be omitted to produce other embodiments of the present disclosure. Moreover, various modifications of the embodiments that are conceivable to those skilled are also included in the present disclosure as long as they do not depart from the scope of the present disclosure, that is, the wording in the claims.

Figure 29:
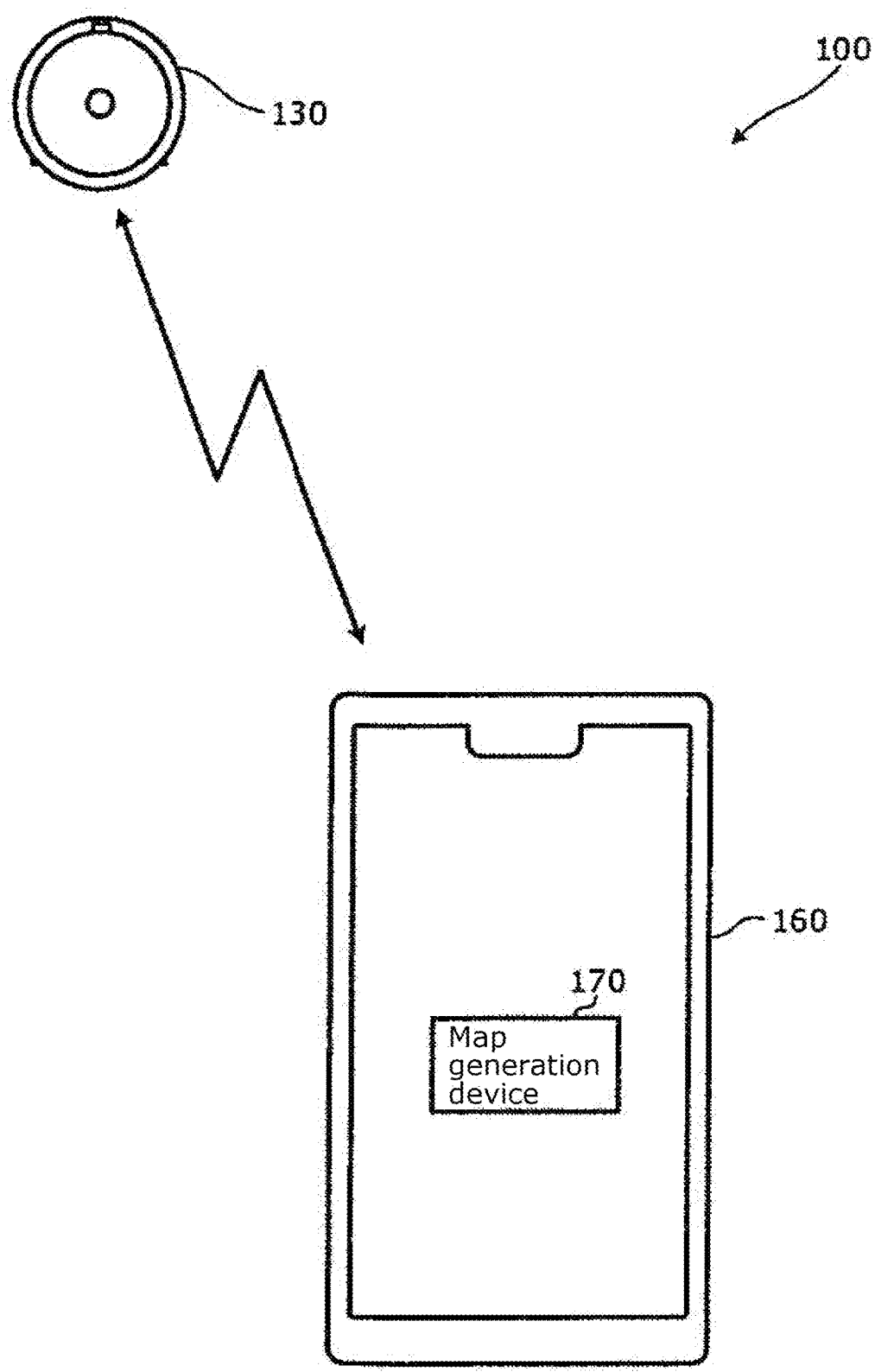
FIG. 29 illustrates an example of a map generation system.

For example, although an example in which mobile apparatus 130 includes map generation device 170 has been described in the above-described embodiments, the present disclosure can be realized by another embodiment. For example, part or all of the processing units of map generation device 170 may be realized by another device that is separate from mobile apparatus 130. For example, as illustrated in FIG. 29, map generation device 170 may be realized in terminal device 160 that is capable of communicating with mobile apparatus 130, by causing a processor of terminal device 160 to execute a program. In this case, map generation system 100 is established by mobile apparatus 130 and terminal device 160.

Figure 30:
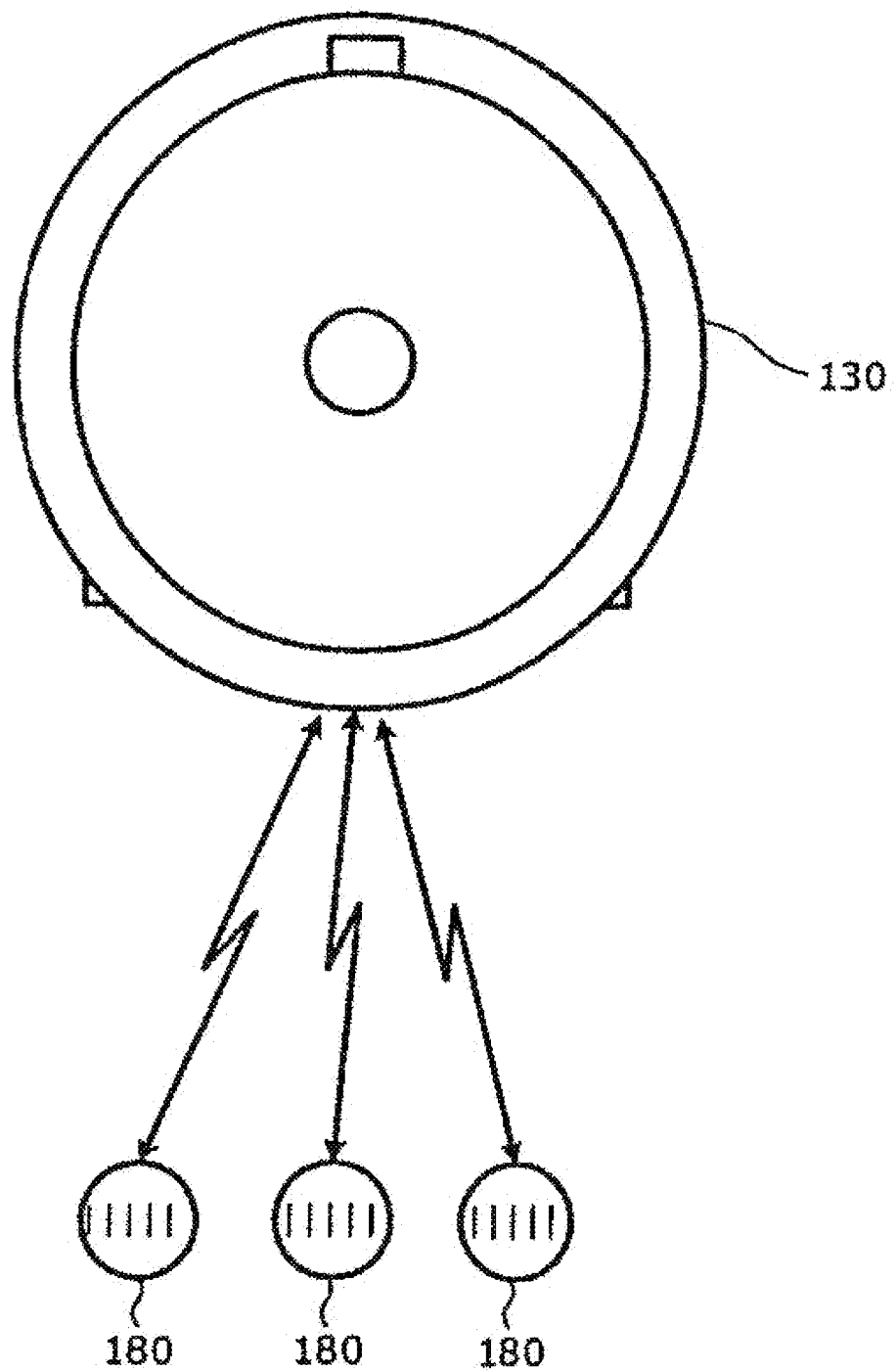
FIG. 30 illustrates another example of a map generation system.

Moreover, as illustrated in FIG. 30, marker provision device 180 may include a driving device that is separate from mobile apparatus 130 and causes marker provision device 180 to travel. In this case, each of a plurality of marker provision devices 180 carries identification information. Moreover, one of the plurality of marker provision devices 180 travels by the driving device, stops at a node on a floor, and functions as a marker, based on provision instruction information from provision instructor 179. Marker provision device 180 placed at a node to which no untraveled path is connected may travel to another node so as to function as a marker of the another node. It should be noted that marker provision device 180 may autonomously travel by obtaining, from map generation device 170, an unfinished route map or the like. Moreover, marker provision device 180 may travel based on an instruction from provision instructor 179 of map generation device 170.

Figure 31:
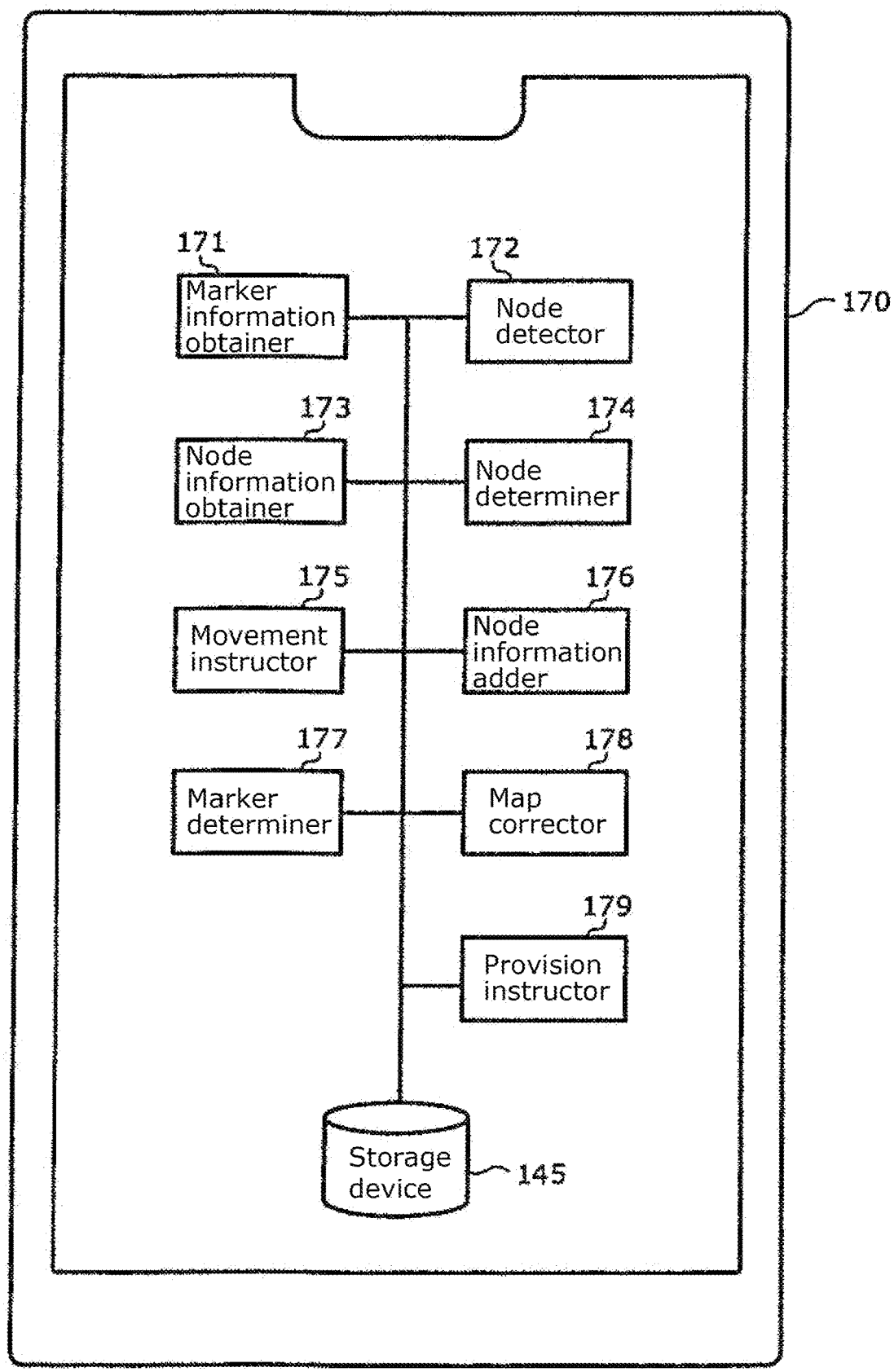
FIG. 31 illustrates an example of a map generation device.

Furthermore, without mobile apparatus 130, it is also possible for a worker carrying around map generation device 170 illustrated in FIG. 31 to generate a map by travelling. In this case, the worker who has reached a node inputs path information relating to a path connected to the node, and node detector 172 obtains the path information. Node determiner 174 determines whether the node matches a previously-reached node, based on the path information. When there is a match, movement instructor 175 instructs the worker to travel, by displaying, on a screen, a position where a marker is present. The worker captures an image of a two-dimensional code or the like provided to the marker, and marker information obtainer 171 obtains identification information of the marker from the image or the like. Moreover, the self-location is obtained by GPS or the like included in the mobile terminal device. Other processes are the same as those in the above, and a route map is generated by correcting an unfinished route map.

Moreover, although an example in which mobile apparatus 130 travels on a floor by wheels has been described in the embodiments, mobile apparatus 130 may be a device that travels three-dimensionally through the air, water, or the like, such as a drone. In this case, paths each of which is connected to a node may three-dimensionally intersect with each other.

INDUSTRIAL APPLICABILITY

The present disclosure is applicable to generation of a route map that is provided to a robot that travels along a predetermined path, such as a cleaning robot, guide robot, security robot, or transport robot.

The invention claimed is:

1. A map generation system comprising:
   a map generation device that generates a route map showing a plurality of paths that intersect with each other;
   a mobile apparatus that includes a first driving device that causes the mobile apparatus to travel along the plurality of paths;
   a self-location detection device that is attached to a body of the mobile apparatus and detects a self-location that is a relative location with respect to a predetermined location;
   a path information obtaining device that obtains path information relating to, among the plurality of paths, a path in which the mobile apparatus is traveling, the path information being a distance and a position of an object that is present in a vicinity of the mobile apparatus; and
   a marker detection device that detects marker information relating to a marker present in at least one place in the plurality of paths by capturing an image of the marker or using laser light to read the marker,
   wherein the map generation device includes:
      a node detector that detects, as a detected node, a node where two or more of the plurality of paths intersect with each other or where one of the plurality of paths comes to a dead end, the detected node being detected based on the self-location of the mobile apparatus detected by the self-location detection device;
      a node information obtainer that obtains detected node information including (i) location information of the detected node that is detected by the node detector and (ii) the path information obtained by the path information obtaining device;
      a node determiner that compares the detected node information with previously-reached node information that is node information already stored, and determines whether the detected node information matches the previously-reached node information;
      a marker information obtainer that obtains the marker information detected by the marker detection device;
      a movement instructor that instructs a search for the marker when the node determiner determines a match;
      a marker determiner that determines whether searched marker information that is marker information obtained through the search and known marker information that is previously-obtained marker information match each other;
      a node information adder that adds, to the route map, the detected node information as new previously-reached node information when the node determiner or the marker determiner determines a mismatch; and
      a map corrector that, when both the node determiner and the marker determiner determine a match, determines that the detected node corresponding to the detected node information and a node corresponding to the previously-reached node information are a same node and corrects the route map.

2. The map generation system according to claim 1, wherein
   the node information adder adds, to the route map, the detected node information as new previously-reached node information when the marker is not recognized through the search.

3. The map generation system according to claim 1, wherein
   the path information obtaining device, the self-location detection device, and the marker detection device travel in conjunction with the mobile apparatus.

4. The map generation system according to claim 1, comprising:
a marker provision device that provides a new marker to the detected node corresponding to the new previously-reached node information when the node information adder adds the new previously-reached node information to the route map.

5. The map generation system according to claim 4, wherein
the marker provision device includes a second driving device that travels along the plurality of paths separately from the mobile apparatus.

6. The map generation system according to claim 5, wherein
the marker provision device functions as the marker and travels to the node separately from the mobile apparatus, in accordance with an order from the map generation device.

7. A map generation system comprising:
a map generation device that generates a route map showing a plurality of paths that intersect with each other;
a mobile apparatus that includes a first driving device that causes the mobile apparatus to travel along the plurality of paths;
a self-location detection device that is attached to a body of the mobile apparatus and detects a self-location that is a relative location with respect to a predetermined location;
a path information obtaining device that obtains path information relating to, among the plurality of paths, a path in which the mobile apparatus is traveling, the path information being a distance and a position of an object that is present in a vicinity of the mobile apparatus; and
a marker detection device that detects marker information relating to a marker present in at least one place in the plurality of paths by capturing an image of the marker or using laser light to read the marker,
wherein the map generation device includes:
a node detector that detects, as a detected node, a node where two or more of the plurality of paths intersect with each other or where one of the plurality of paths comes to a dead end, the detected node being detected based on the self-location of the mobile apparatus detected by the self-location detection device;
a node information obtainer that obtains detected node information including (i) location information of the detected node that is detected by the node detector and (ii) the path information obtained by the path information obtaining device;
a node determiner that compares the detected node information with previously-reached node information that is node information already stored, and determines whether the detected node information matches the previously-reached node information;
a marker information obtainer that obtains the marker information detected by the marker detection device;
a movement instructor that instructs a search for the marker when the node determiner determines a match;
a marker determiner that determines whether searched marker information that is marker information obtained through the search and known marker information that is previously-obtained marker information match each other;
a node information adder that adds, to the route map, the detected node information as new previously-reached node information when the node determiner or the marker determiner determines a mismatch; and
a map corrector that, when both the node determiner and the marker determiner determine a match, determines that the detected node corresponding to the detected node information and another node corresponding to the previously-reached node information are a same node and corrects the route map,
wherein the map generation device generates the route map based on the path information, and
wherein the map generation system further comprises a marker provision device provides a new marker to the detected node corresponding to the new previously-reached node information when the node information adder adds the new previously-reached node information to the route map.

8. The map generation system according to claim 7, wherein
the marker provision device includes a second driving device that travels along the plurality of paths separately from the mobile apparatus.

9. The map generation system according to claim 8, wherein
the marker provision device functions as the marker and travels to the node separately from the mobile apparatus, in accordance with an order from the map generation device.

* * * * *